US006792260B1

(12) United States Patent
Ezuriko

(10) Patent No.: US 6,792,260 B1
(45) Date of Patent: Sep. 14, 2004

(54) AUTOMATIC RADIO WAVE OUTPUT LIMITING SYSTEM FOR PORTABLE TELEPHONE SET

(75) Inventor: Hiroshi Ezuriko, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/971,320

(22) Filed: Oct. 5, 2001

Related U.S. Application Data

(62) Division of application No. 09/291,311, filed on Apr. 15, 1999, now Pat. No. 6,445,913.

(30) Foreign Application Priority Data

Apr. 17, 1998 (JP) .......................................... 10-123985
Mar. 5, 1999 (JP) ............................................. 11-57951
Mar. 19, 1999 (JP) ............................................ 11-76473

(51) Int. Cl.[7] ............................................... H04Q 7/20
(52) U.S. Cl. ...................................................... 455/403
(58) Field of Search ................................ 455/435, 449, 455/26.1, 418, 403, 422

(56) References Cited

U.S. PATENT DOCUMENTS

| | | | | |
|---|---|---|---|---|
| 4,771,448 A | * | 9/1988 | Koohgoli et al. | ............ 455/435 |
| 4,790,000 A | * | 12/1988 | Kinoshita | .................... 455/449 |
| 6,052,577 A | * | 4/2000 | Taguchi | ..................... 455/26.1 |
| 6,421,544 B1 | * | 7/2002 | Sawada | ...................... 455/418 |
| 2002/0019222 A1 | * | 2/2002 | Ezuriko | ....................... 455/403 |
| 2002/0019226 A1 | * | 2/2002 | Ezuriko | ....................... 455/422 |
| 2002/0022469 A1 | * | 2/2002 | Ezuriko | ....................... 455/403 |
| 2002/0022470 A1 | * | 2/2002 | Ezuriko | ....................... 455/403 |
| 2002/0032017 A1 | * | 3/2002 | Ezuriko | ....................... 455/403 |

FOREIGN PATENT DOCUMENTS

| | | |
|---|---|---|
| JP | 9-284845 | 10/1997 |
| JP | 9-307641 | 11/1997 |
| JP | 9-331576 | 12/1997 |

* cited by examiner

*Primary Examiner*—William Cumming
(74) *Attorney, Agent, or Firm*—Whitham, Curtis & Christofferson, P.C.

(57) ABSTRACT

To provide a portable telephone output limitation management device in which use of a portable telephone set is automatically limited in a site where the use of the set is limited and in which causes of non-response and other various information can be transmitted to an originating party who called the use-limited portable telephone set. The portable telephone output limiting management device issues a radio wave signal of the output limiting command information from an antenna. On reception of the output limiting command information from the antenna, the portable telephone set enters into the output limiting mode to halt direct exchange with a base station and sends out the information on the fact that the set has entered into the output limiting mode. The information includes the portable telephone set management number, telephone number reply message and a notification information flag to the portable telephone output limiting management device, which then takes the place of the portable telephone set to reply to the call-out from the base station until the time the portable telephone set receiving the output limiting command exits the use-limited site.

21 Claims, 13 Drawing Sheets

FIG. 4

| | PORTABLE TELEPHONE MANAGEMENT INFORMATION | PORTABLE TELEPHONE NUMBER | VOICE MESSAGE | NOTIFICATION FLAG | | | | NOTIFICATION INFORMATION | |
|---|---|---|---|---|---|---|---|---|---|
| | | | | NUMBER | VOICE | SITE | LINE NAME | NONE | |
| 1 | 384kk33343k90rkkd | 030-1X-XX11 | | O | | | | | |
| 2 | dfdk34ikid9emfkdfdf | 020-80-0X43 | SATO | | O | O | | | |
| 3 | 230909010I0P0233 | 030-X0-XX00 | | O | | | | | |
| 4 | 99FFWQ10SSLSJDD | 080-17-0X22 | SUZUKI | | O | | O | | |
| 5 | 34JD9KJ3NFJD224 | | | | | | | O | |
| 6 | 329J9J1ISDJK32JD | 050-10-0X05 | TANAKA | O | | | | | |
| 7 | 09UJCJ8831SKWD | 010-X0-0X03 | NAKAMURA | | O | O | O | | |
| 8 | 93J838H34U3KDJ | 010-33-XX00 | | | O | | O | | |
| 9 | LE09JF8SDSKK01E | 030-10-0X00 | | | | | | | |
| 10 | | | | | | | | | |
| 11 | | | | | | | | | |
| 12 | | | | | | | | | |
| 13 | | | | | | | | | |
| 14 | | | | | | | | | |
| 15 | | | | | | | | | |

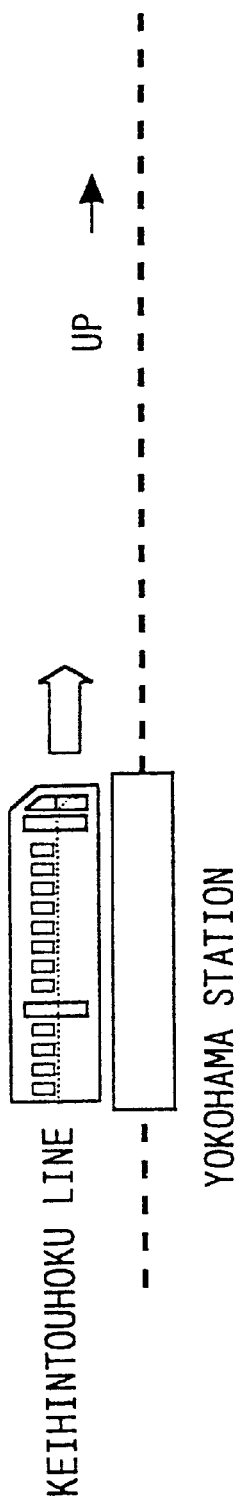
FIG. 5a EXAMPLE 1
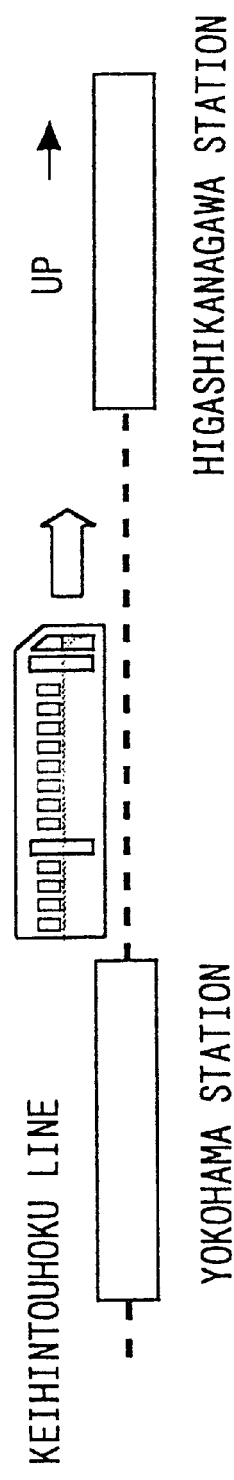
FIG. 5b EXAMPLE 2

FIG. 9

| | PORTABLE TELEPHONE MANAGEMENT INFORMATION | PORTABLE TELEPHONE NUMBER | VOICE MESSAGE | CALL ONCOMING PERMITTING FLAG | NOTIFICATION FLAG | | | | NOTIFICATION INFORMATION | | |
|---|---|---|---|---|---|---|---|---|---|---|---|
| | | | | | NUMBER | VOICE | SITE | LINE NAME | NONE | | |
| 1 | 384kk33343k90rkkd | 030-1X-XX11 | | ○ | ○ | | | | | | |
| 2 | dfdk34ikid9emfkdfdf | 020-80-0X43 | SATO | | | ○ | ○ | | | | |
| 3 | 23090901010P0233 | 030-X0-XX00 | | ○ | ○ | | | | | | |
| 4 | 99FFWQIOSSLSJDD | 080-17-0X22 | SUZUKI | | | ○ | | ○ | | | |
| 5 | 34JD9KJ3NFJD224 | | | | | | | | ○ | | |
| 6 | 329J9J11SDJK32JD | 050-10-0X05 | | ○ | ○ | | | | | | |
| 7 | 09UJCJ8831SKWD | 010-X0-0X03 | TANAKA | | ○ | | | | | | |
| 8 | 93J838H34U3KDJ | 010-33-XX00 | | ○ | | ○ | ○ | ○ | | | |
| 9 | LE09JF8SDSKKOIE | 030-10-0X00 | NAKAMURA | ○ | | ○ | | ○ | | | |
| 10 | DFFF8555F5FGF3G | 010-60-0X01 | ENDO | ○ | | ○ | ○ | ○ | | | |
| 11 | | | | | | | | | | | |
| 12 | | | | | | | | | | | |
| 13 | | | | | | | | | | | |
| 14 | | | | | | | | | | | |
| 15 | | | | | | | | | | | |

<BUS SETTING A MODE>

<BUS SETTING B MODE>

FIG. 13
PROCESS OF REPEATER DEVICE
<STEADY STATE>
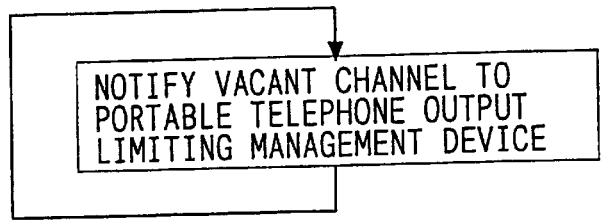
<ESTABLISHMENT OF COMMUNICATION RELAYING>
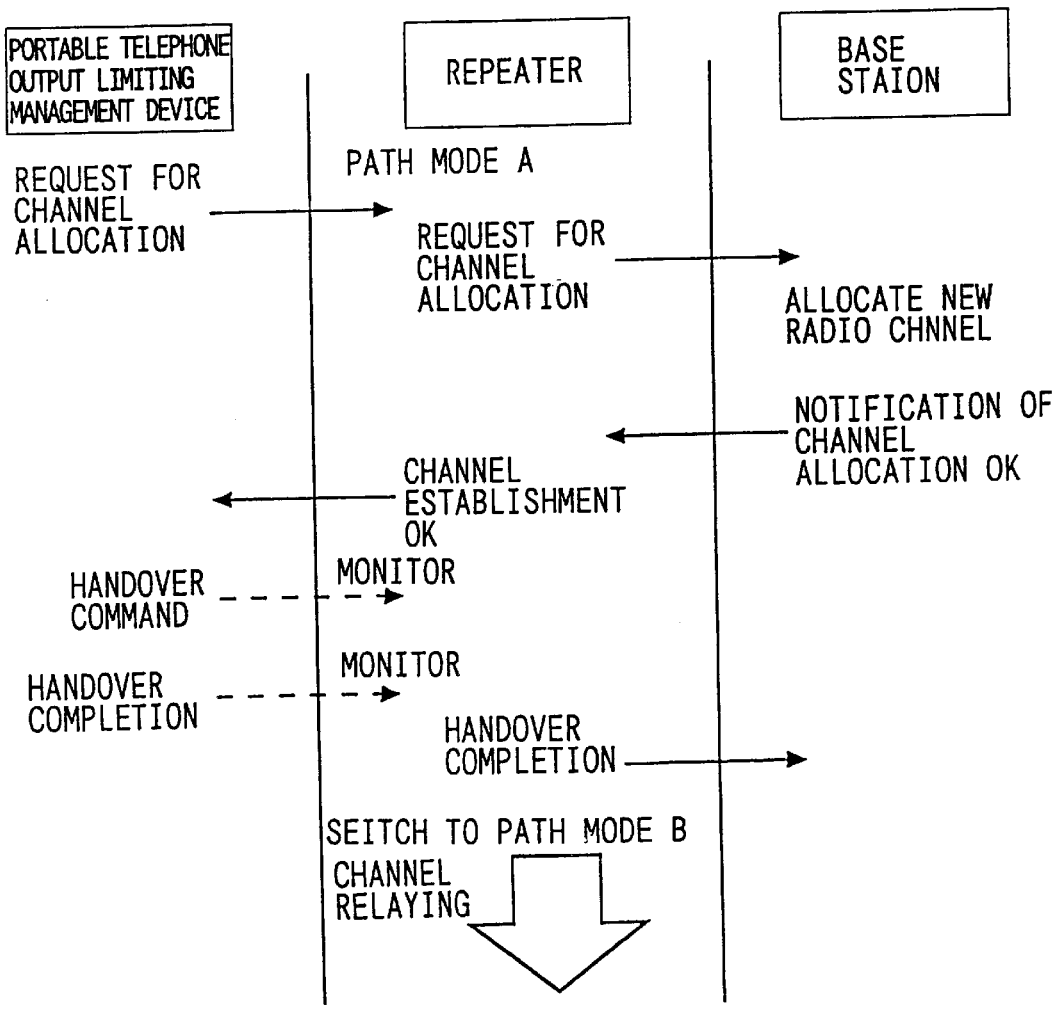

AUTOMATIC RADIO WAVE OUTPUT LIMITING SYSTEM FOR PORTABLE TELEPHONE SET

This application is a division of Ser. No. 09/291,311 filed Apr. 15, 1999 now U.S. Pat. No. 6,445,913.

FIELD OF THE INVENTION

This invention relates to a wireless portable telephone communication system comprising at least a base station and a portable telephone set as a mobile station connected by a wireless communication to the base station. More particularly, the invention relates to an automatic radio wave output limiting system for a portable telephone set especially in public sites where limitation is imposed on the use of the portable telephone set.

BACKGROUND

Recently, with rapid increase in the number of users of cellular phone set and mobile information terminals communicating with a base station by a wireless communication (termed as a portable telephone set), those failing to observe the manner in using the portable telephone set are also increasing in number. In particular, there are passengers in electric rolling stock who use portable telephone sets despite fact that the passengers of the electric rolling stock are requested not to use the portable telephone sets by announcing.

In order to cope with the above-described problems, there is proposed in, for example, the JP Patent Kokai JP-A-9-331576 a system in which a call inhibiting/limiting station issuing a use limiting signal to portable telephone sets is provided in an area where it is desired to limit the use of the portable telephone sets, such as hospitals, libraries or museums, and in which means for receiving the use limiting signal sent out from the call inhibiting/limiting station and means for limiting the origination/incoming of a call at the time of reception of the use limiting signal are provided on the portable telephone set, so that, when the portable telephone set is moved to a use-limited area and is receiving the use limiting signal, it is possible to suppress the incoming of a call from a base station to the portable telephone set as well as the transmission from the portable telephone set to the base station.

SUMMARY OF THE DISCLOSURE

However, the portable telephone set the use of which has now been limited by the system proposed in JP Patent Kokai JP-A-9-331576 is virtually completely disconnected from a mobile communication network, such that, if someone intends to call an owner of the portable telephone set, a message indicating no response, such as a message running "the telephone set you are calling is outside the range of arrival of radio waves or has the power source of the portable telephone set turned off and cannot be called" is returned to the originating party.

In such case, the originating party (the party intending to call the portable telephone set) is not in a position to grasp whether the absence of response from the called portable telephone set is ascribable to the power source being off, the portable telephone set being outside the reaching range of radio waves or the portable telephone set is in the use-limited area.

There is also presented a problem that, if the owner of the portable telephone set of the system proposed in JP Patent Kokai JP-A-9-331576 is in a use-limited area without recognizing that he or she is in the use-limited are, the portable telephone set is unable to receive the incoming call, despite the fact that he or she has not made an operation of turning his or her portable telephone set off, that is an operation of relinquishing the call reception, such that he or she cannot have communication with the originating party against his or her intention.

It is therefore an object of the present invention to provide a portable telephone communication system in which the use of the portable telephone set is automatically limited in its use in an area where limitations on use of the portable telephone set are imposed, such as in a public means of traffic, e.g., in electric rolling stocks, or in public sites, and in which the causes of the absence of the response and various other information can be transmitted to an originator of a call to the use-limited portable telephone set.

It is another object of the present invention to provide a system in which incoming of a call is communicated to the portable telephone set in a use-limited area so that the portable telephone set is able to communicate with the originating side after the portable telephone set has moved to a site where it is permitted to use the portable telephone set.

For accomplishing the above object, the present invention provides a mobile communication system, comprising: a base station; a mobile station terminal; and controlling means for limiting output of the mobile station terminal, the controlling means comprising: means for sending a reply message to said base station on reception of a call signal addressed to said mobile station terminal sent from said base station, in place of the mobile station terminal, a wireless communication of the mobile station terminal with said base station being limited.

Also the present invention provides the mobile communication system, as described above, the controlling means further comprising: means for sending out an output limitation command signal to the mobil station terminal located in a site where use of the mobile station terminal is limited, means for receiving information containing the reply message sent back from the mobile station terminal which receives the output limitation command signal to enter into an output-limitation mode; and means for registering and managing the mobile station terminal as an output-limited terminal.

Further the present invention provides a mobile communication system, comprising: a base station; a mobile station terminal; and controlling means for limiting output of the mobile station terminal, the controlling means comprising: means for causing a call incoming to arrive with a low powered radio wave at the mobile station terminal in a output-limited mode on reception of said call incoming addressed to the mobile station terminal, the means transmitting a reply message in response to the incoming to the mobile station terminal in place of the mobile station terminal to the base station.

In accordance with another aspect the present invention provides a portable telephone set output limiting system including a portable telephone output limiting management device for transmitting a radio signal message comprising an output limiting command information from a first antenna provided on a site where use of the portable telephone set is limited. When the portable telephone set enters the site to receive the output limitation command information transmitted from the first antenna, the output limiting mode is initiated to halt direct exchange with a base station to transmit to the first antenna of the portable telephone output limiting management device a message including the fact of entrance to an output cessation mode of the portable telephone set, and the inherent information including a management member of the portable telephone set, telephone number, a reply message and a notification information flag, if need be, with a low power out put mode . The portable telephone output limiting management device receives the inherent information sent out from the portable telephone set through the first antenna to update and registers the proper information in a management table on a portable telephone base. The portable telephone output limiting management device assumes that the portable telephone sets registered in the management table as being the portable telephone sets placed under its control so that subsequently the portable telephone output limiting management device responds to the call-out from the base station to take the place of the portable telephone set in the output limited state until the portable telephone set commanded to be output-limited exits the site.

The portable telephone output limiting management device according to the present invention comprises means for sending out an output limitation command signal for limiting outputting of radio signal via a first antenna provided at a site where the use of a portable telephone set is limited to a portable telephone set located in a site where use of a portable telephone set is limited, and means for receiving the information inherent in the portable telephone set, transmitted from the portable telephone set which has received the output limiting command signal to halt the communication with the base station so as to be in the output-limited state, via the first antenna, to supervise the portable telephone set in the output-limited state along with registering the proper information including the call incoming permitting information in a management table. The portable telephone output limiting management device according to the present invention comprises a second transmission/reception antenna for having wireless communication with the base station and means for automatically transmitting to the originating side a reply message to an incoming call to the portable telephone set in the output limiting mode to take the place of the set. It is noted that the inherent information of the portable telephone set transmitted from the portable telephone set in the output-limiting mode includes the information on the reply message.

In accordance with another aspect of the present invention, the portable telephone set also comprises means for limiting the outputting of the portable telephone set on reception of the output limitation command signal from the portable telephone output limiting management device via the first transmission/reception antenna and means for transmitting the inherent information of the portable telephone set via the first transmission/reception antenna to the portable telephone output limiting management device when the portable telephone set has entered into the output limiting mode.

In accordance with a further aspect of the present invention, the portable telephone output limiting management device also comprises means for transmitting an output limiting command signal via a first antenna provided in a site where use of the portable telephone set is limited to a portable telephone set located in the site where use of the portable telephone set is limited, means for receiving an inherent information of the portable telephone set transmitted from the portable telephone set which has received the output limiting command signal to halt radio communication with a base station so as to be in the output-limited state, via the first antenna, to register and supervise the portable telephone set in the output limited state along with the inherent information and an incoming call permitting information, a second antenna for having radio communication with the base station and means for having reference to the call incoming permitting information from the inherent information received from the portable telephone set and stored in a management table in case of a call incoming to the portable telephone set in the output limiting state and for notifying the incoming of the call to the portable telephone set in case of permission of the incoming call, and means for sending message indicating an state of the call incoming in the portable telephone for notifying the state to an originating side.

On reception of a pre-set response transmitted from a portable telephone set via a third antenna provided in the use-permitted site, the portable telephone output limitation management device transmits to the base station a message as to the portable telephone set being in a moving state until such time as a user of the portable telephone set moves from the use-limited site to the use-permitted site.

In accordance with a further aspect of the present invention, if a pre-set reply transmitted from the portable telephone set is received via the third antenna provided in a use-permitted site, it is assumed that the portable telephone set has moved to the use-permitted site. A handover command then is issued to effect handover process to a radio channel of an antenna connected to a repeater for the portable telephone set responsible for establishing connection between the portable telephone set in the output-limited state and the base station, at the same time as the transmission of the message indicating the moving state is halted and a request is made for a radio channel between the base station and the repeater for the portable telephone set responsive to the handover command. Still other objects and advantage of the present invention will become readily apparent to those skilled in the art from the following detailed description wherein preferred embodiment of the invention is shown and described. The drawing and description are to be regarding as illustrative in nature and not as restrictive.

BRIEF DESCRIPTION OF THE DRAWINGS

FIG. 4 shows an example of the contents of a limited portable telephone information supervising table in an embodiment of the present invention.

FIGS. 5a and 5b illustrates two examples of an embodiment of the present invention.

FIG. 9 shows an example of the contents of a limited portable telephone information supervising table in the second embodiment of the present invention.

FIG. 13 is a sequence diagram for illustrating the operation of a repeater for the portable telephone set in the third embodiment of the present invention.

PREFERRED EMBODIMENTS OF THE INVENTION

In the following, certain present embodiments of the present invention are explained. In preferred forms of the present invention, a radio wave for commanding a cessation of outputting of a radio wave of a portable telephone set from an antenna 3 in a carriage of the electric rolling stock, representing a use-limited site of the portable telephone set, are emitted to limit the outputting of the portable telephone set in the carriage of the electric rolling stock.

At the same time as the owner of a portable telephone set 4 goes into a carriage of the electric rolling stock, the portable telephone set 4 receives an output stop command signal emitted from the antenna 3 as a result of which its basic function, such as voice communication and data communication, are suppressed.

When having entered into the output-limited state, the portable telephone set transmits a message indicating completion of entrance of the output limited state and the identification information proper to the portable telephone set, with a low powered radio wave, to a portable telephone output limiting management device 2. The identification information includes, for example, an identification information for the portable telephone set, telephone number of the portable telephone set, a response message information and a communication information flag for specifying with which response pattern the portable telephone output limiting management device responds to the call from a base station. The portable telephone output limiting management device 2 then registers the portable telephone set in the output-limited state in a registration table for management purposes.

If, during a time when the outputting of the portable telephone set is suppressed, there is a incoming call from the base station 5, the portable telephone output limiting management device 2 automatically sends a reply message indicating that the user is on the electric rolling stock and cannot talk by telephone. This reply message takes the place of the output originating from portable telephone set 4.

As the reply message of the automatic response, selection may be made from several patterns in accordance with setting on a side of the portable telephone set 4.

On the other hand, in a shinkansen carriage or in a limited express train, use of a portable telephone set is inhibited in a seated passenger carriage, while its use is permitted in a deck etc. In a present second embodiment, incoming of a call is permitted in such carriage and call can be continued if the portable telephone set is moved to a site where the use of the portable telephone set is permitted.

Figure 6:
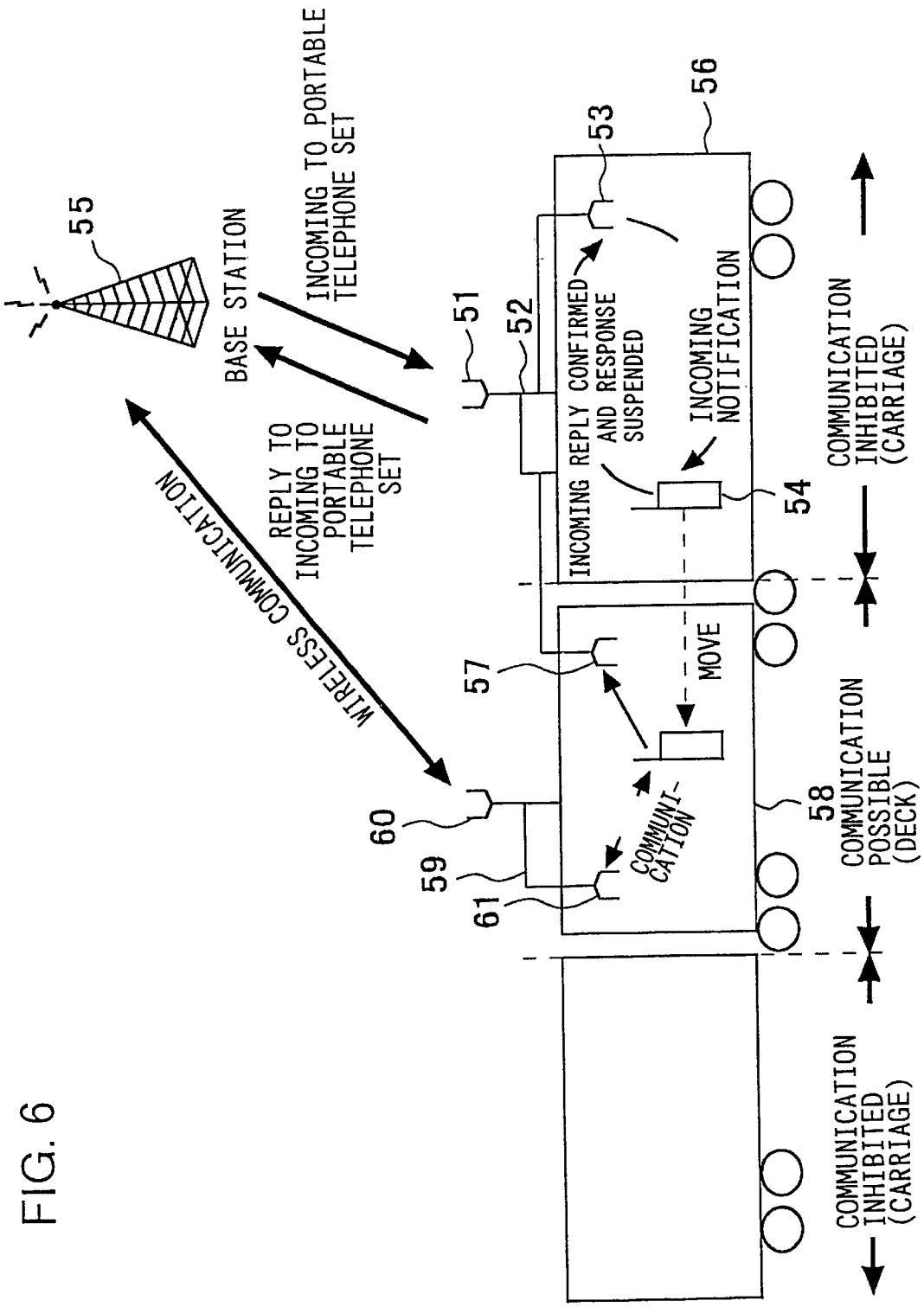
FIG. 6 illustrates the structure and the operation of the entire system of a second embodiment of the present invention.

Referring specifically to FIG. 6, a portable telephone output limiting management device 52 is provided for emitting radio wave signals of an output limitation command information to limit an outputting of a radio wave from the portable telephone set via a first antenna 53 provided in a site of limiting use of a portable telephone set. When a portable telephone set 54 enters such site, and receives the output limitation command information from the first antenna, the portable telephone set switches into the output limitation mode to stop direct exchange with a base station, while sending out to the first antenna of the portable telephone output limiting management device, with low powered radio wave, a message comprising a fact that the portable telephone set has entered into the output limiting mode, and the inherent information including the management number and the telephone number of the portable telephone set, occasionally with response message, communication information flag and an incoming permission flag.

The portable telephone output limiting management device 52 receives the inherent information from the portable telephone set, via the first antenna 53, and updatingly registers contents of the information in the management table, on a portable telephone set base, and controls the portable telephone set, registered in the management table, as being a portable telephone set under its management.

The portable telephone output limiting management device 52 also includes a second antenna 51 for having radio communication with a base station 55. If there is an incoming message from the base station 55 to the portable telephone set 54 in the output-limited state, the portable telephone output limiting management device 52 makes a reference to an incoming permitting flag, receiving from the inherent information of the portable telephone set and stored in the management table. If the flag indicate the incoming being permitted, the portable telephone output limiting management device 52 communicates the state of call incoming from the base station 55 to the portable telephone set 54, while transmitting a message indicating the fact of the call incoming to the base station 55 for communication to an originating side.

In a site 58 where use of a portable telephone set is permitted, there is provided a repeater device 59 for a portable telephone set adapted for establishing a radio channel between the portable telephone set and the base station and for accepting a radio channel of the output-limited portable telephone set based on a handover request from the portable telephone output limiting management device.

On reception of a response to an incoming of a call with a radio wave transmitted with low power from the output-limited portable telephone set, the portable telephone output limiting management device 52 transmits to the base station a message to the effect that the user of the portable telephone set is moving from a use-limited site to a use-permitted site 58 during the time of such movement. If, in this case, the portable telephone output limiting management device 52 receives a pre-set response (second incoming response) transmitted from a third antenna 57, installed in the use-permitted site 58 and which is connected to the portable telephone output limiting management device 52, the latter judges that the portable telephone set has moved to the use-permitted site 58, and accordingly issues a hand-over command to a radio channel of the antenna connected to a repeater device 59 for the portable telephone set, while halting the transmission of a message indicating the fact of movement to the base station.

Figure 8:
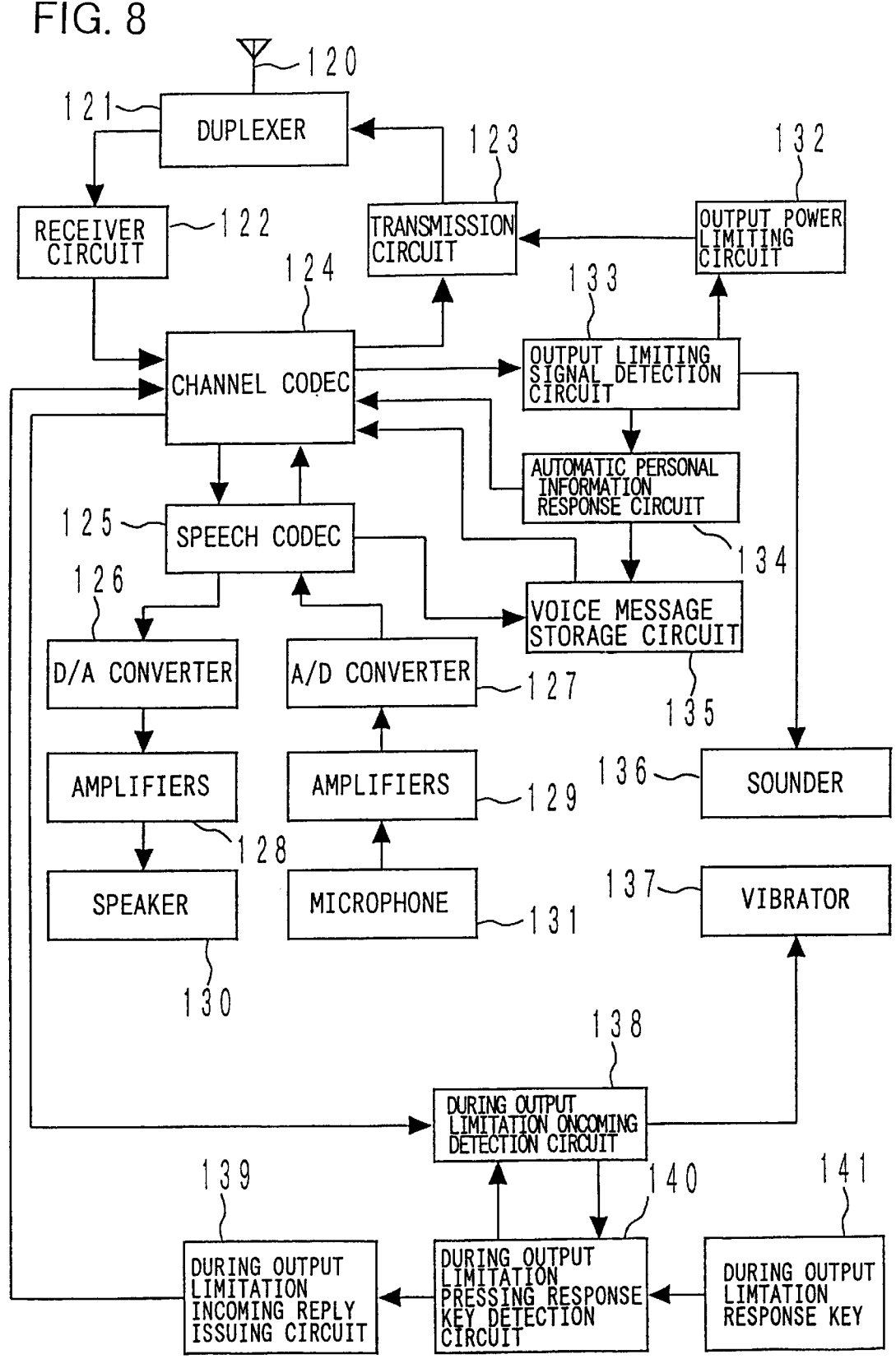
FIG. 8 shows the structure of a portable telephone output limiting management device in the second embodiment of the present invention.

In its present embodiment, shown in FIG. 8, the portable telephone set includes means 138 for discriminating that an output limitation signal from the portable telephone output limiting management device is being received, means 134 for automatically returning an identification information of the portable telephone set entering into the output limitation mode, and means 139, 140, 141 for detecting the incoming control signal during the output limiting mode to return the incoming information during output limitation.

[Embodiments]

For further illustrating the above-described embodiment of the present invention, reference is had to the drawings showing the embodiment.

Figure 1:
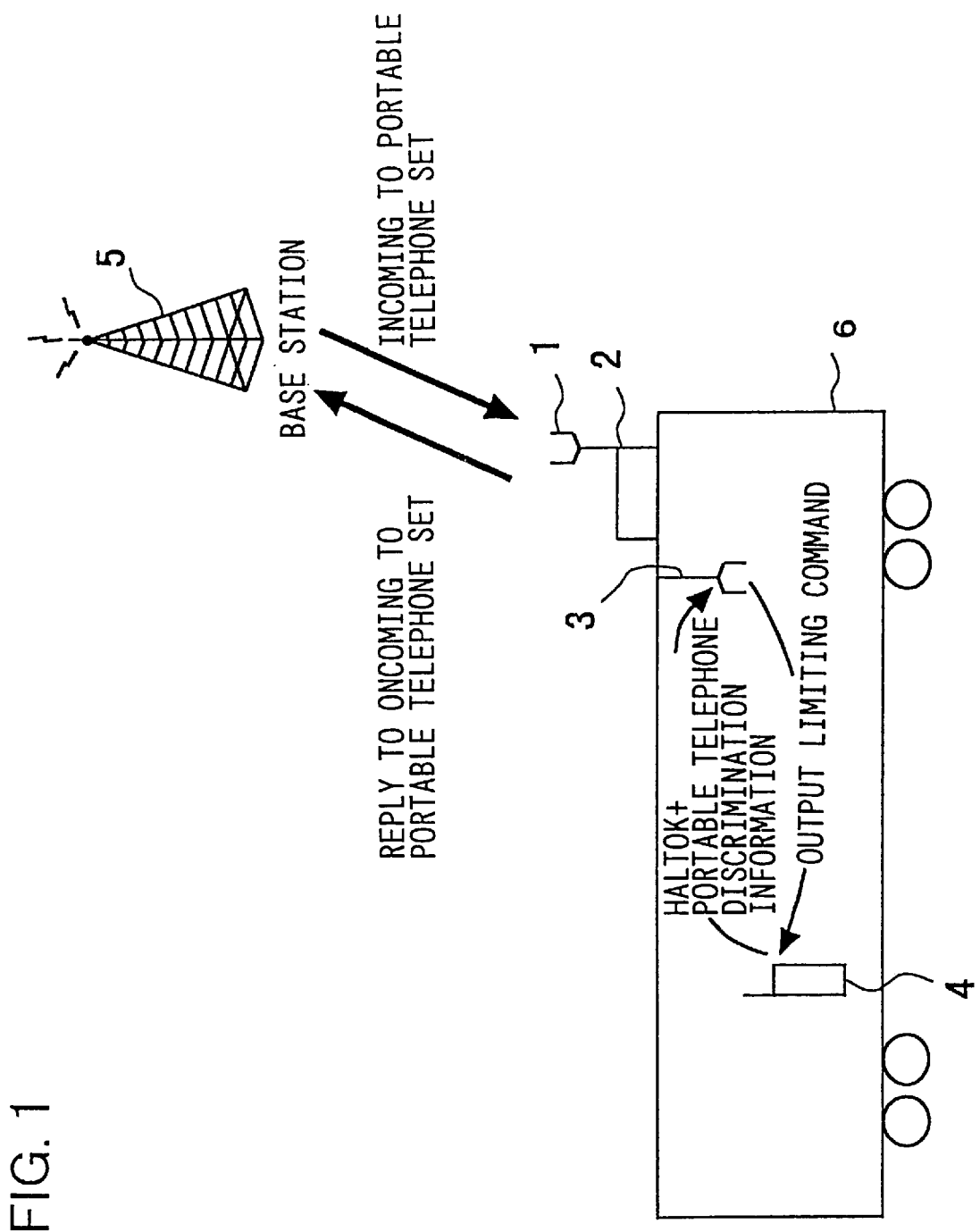
FIG. 1 illustrates the structure and the operation of the entire system of an embodiment of the present invention.

FIG. 1 illustrates the overall structure of a communication system of a first embodiment of the present invention and its operation. Although the present invention can be applied to public transportation and traffic means, such as electric rolling stocks or buses, the following description is made with reference to an embodiment as a typical example in which the present invention is applied to an electric rolling stock or train.

Referring to FIG. 1, the first embodiment of the present invention can generally be classified into two apparatus configurations. One of the configurations is an apparatus made up of an antenna 1 outside the carriage, a portable telephone output limiting management device 2 and an antenna 3 within the carriage and which has the function of limiting the use of the portable telephone set, with the other being a portable telephone set 4.

The portable telephone set 4 is arranged to have a function of receiving and discriminating an output limitation signal (a signal indicating suppression of outputting of a radio wave) transmitted from the portable telephone output limiting management device 2 and a function of automatically returning an identification information of the portable telephone set.

It the portable telephone set 4 is outside a carriage 6, that is if the owner is not on board the carriage 6, the portable telephone set 4 directly communicates with a base station 5 over a radio channel to receive services of voice communication. If the owner of the portable telephone set enters into the carriage 6, the portable telephone set 4 receives an output limitation signal (a signal limiting the communication with the base station) transmitted from the antenna 1 accommodated in the carriage 3 to halt communications by a radio wave with the base station 5.

The portable telephone set 4 then transmits a message comprising a fact of cessation of communication with the base station 5, the portable telephone identification information proper to the portable telephone set 4, telephone number or voice message, to the portable telephone output limiting management device 2.

From this time on, the outputting of any radio wave to a base station whatsoever of the portable telephone set 4 ceases until it gets out of the carriage 6.

On reception of the portable telephone identification information transmitted from the portable telephone set 4 and other signals, such as the telephone number of the voice message via the antenna 3 in the carriage 6, the portable telephone output limiting management device 2 recognizes that the portable telephone set 4 is now under management by the device 2. From this time on, the portable telephone output limiting management device 2 responds to an incoming call to the portable telephone set 4 from the base station 5 to take the place of the portable telephone set 4.

Figure 2:
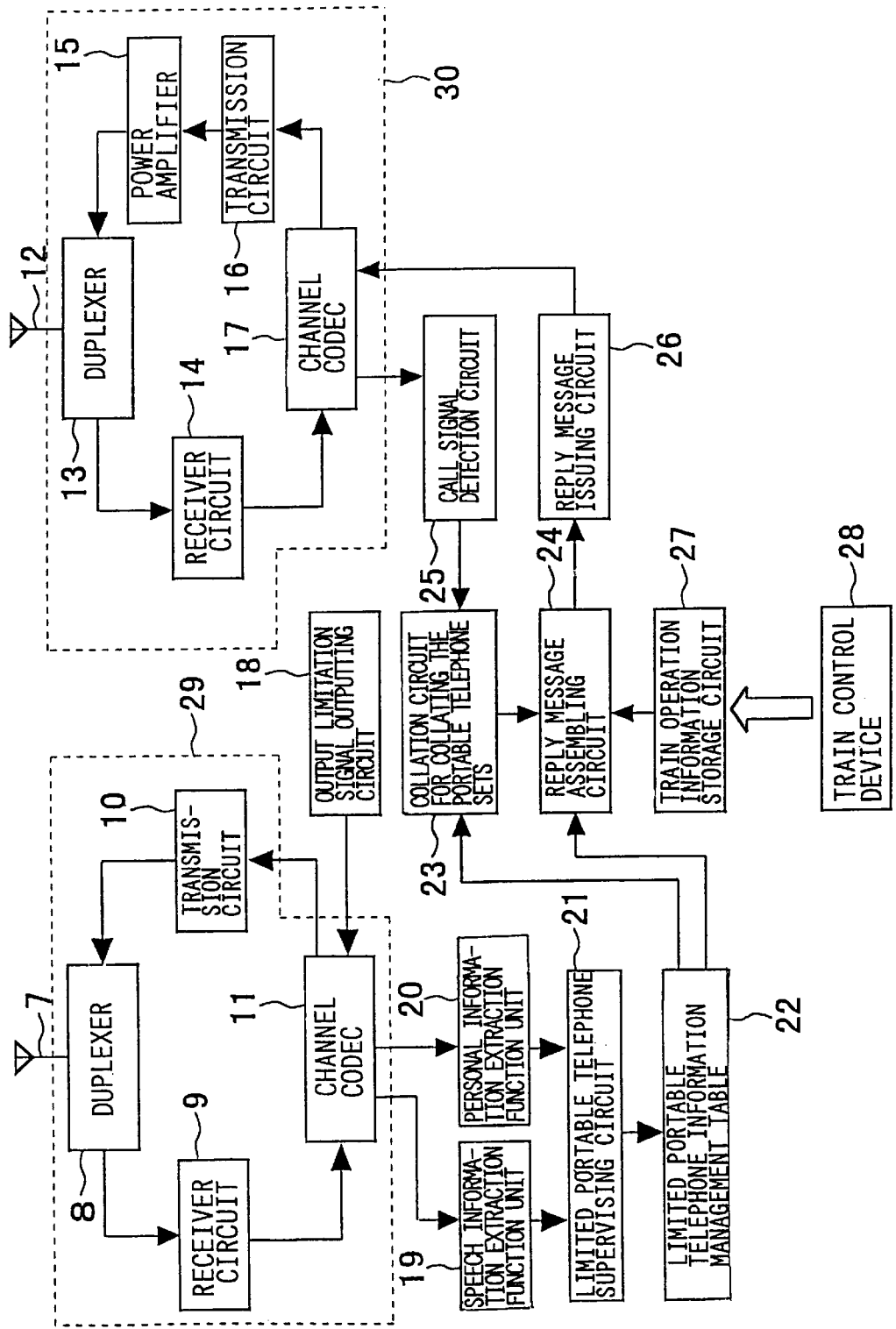
FIG. 2 shows the structure of a portable telephone output limiting management device in an embodiment of the present invention.

FIG. 2 is a block diagram showing an illustrative structure of the portable telephone output limiting management device 2 in a present embodiment of the present invention.

Referring to FIG. 2, a circuit block 29, made up of an antenna in the carriage 6 (corresponding to transmitting/receiving antenna 3), a duplexer 8, a receiver (reception) circuit 9, a transmitting circuit 10, and a channel codec 11, is designed to communicate with the portable telephone set 4 carriage 6.

On the other hand, a circuit block 30 made up of an antenna 12 outside the carriage 6,(corresponding to transmitting/receiving antenna 1), a duplexer 13, a receiver circuit 14, a power amplifier 15, a transmission circuit 16 and a channel codec 17, is designed to communicate with the base station 5.

An output limitation signal outputting circuit 18 sends to the channel codec 11 a digital information command for limiting a transmission output of a radio wave from the portable telephone set. The channel codec 11 converts the output limiting signal sent from the output limitation signal outputting circuit 18 into an information form that permits reception by the portable telephone set to send the converted output limitation signal as transmission digital signals to the transmission circuit 10. The transmission circuit 10 modulates and amplifies the transmission digital signals from the channel codec 11 to route the resulting signals to the duplexer 8. The duplexer 8 feeds the transmission signal from the transmission circuit 10 to the antenna 7 in the carriage 6, which then transmits the transmission radio signal from the transmission circuit 10 into a space inside of the carriage.

On the other hand, the antenna 7 in the carriage 6 receives a radio signal containing information such as a portable telephone identification information proper to the portable telephone set, telephone number or voice message, transmitted from the portable telephone set 4, designed to cope with the portable telephone output limiting management device provided in the carriage, and converts the received radio signal into electrical signals, which then are routed to the duplexer 8. The latter then separates the electrical signal sent thereto from the antenna 7 in the carriage to route the separated electrical signals to a receiver circuit 9.

The receiving circuit 9 demodulates the electrical signals sent thereto from the duplexer 8 to convert the demodulated electrical signals into digital data which is routed to the channel codec 11. The channel codec 11 synchronizes the received digital data, fed from the receiver circuit 9, and extracts an information portion containing the information required to send the digital data of the extracted information portion to a voice information extraction function unit 19 and to a personal information extraction function unit 20.

The personal information extraction function unit 20 extracts a portable telephone identification information and a telephone number, from the digital data fed from the channel codec 11, to send the information to a limited portable telephone supervising circuit 21.

The speech information extraction function unit 19 extracts a voice message information from the digital data fed from the channel codec 11 to send the extracted voice message information to the limited portable telephone supervising circuit 21.

The limited portable telephone supervising circuit 21 stores the portable telephone identification information and the telephone number, sent from the personal information extraction function unit 20, and the voice message information, sent from the speech information extraction function unit 19, in a limited portable telephone information management table 22, comprised of a storage device.

In the limited portable telephone information management table 22, there are stored, for the totality of the portable telephone sets, for which the output limitation has been made under supervision by the portable telephone output limitation management device 2, portable telephone identification information, telephone number information, and voice message information.

FIG. 4 shows an illustrative structure of the limited portable telephone information management table 22 in a present embodiment, and schematically shows stored contents of the portable telephone identification information, information on the telephone number and voice message. Referring to FIG. 4, the limited portable telephone information management table 22 is made up of the portable telephone identification information, portable telephone number, voice message and flags for the information for communication. The registered contents of the limited portable telephone information management table 22 will be explained subsequently in detail.

Referring again to FIG. 2, a train operation information storage circuit 27 accepts data concerning states of operation of vehicles, incessantly changing with time, from a train control device 28, in order to store latest information at all times.

The portable telephone output limiting management device 2 perpetually monitors the radio wave containing the call information (incoming signals) addressed to the portable telephone sets it is managing, in order to return a response to the base station 5 in place of the portable telephone set 4 in the carriage 6 if the portable telephone set 4 is called.

The antenna 12 outside the carriage 6 (corresponding to transmitting/receiving antenna 1) receives a radio wave from the base station 5 and converts it into an electrical signal which is sent to the duplexer 13. The duplexer 13 separates the electrical signal sent from the antenna 12 outside the carriage 6 to send the separated electrical signal to the a receiver circuit 14, which then demodulates the electrical signal sent from the duplexer 13 to send the received digital data to a channel codec 17.

The channel codec 17 synchronizes the received digital data sent from the receiver circuit 14 to extract the information portion containing the significant information to send the digital data of the information part to a call-out signal detection circuit 25.

The call signal detections circuit 25 detects the call-out signal to capture the inherent information of the portable telephone set to send the inherent information of the portable telephone set to a collection circuit 23 for collating the portable telephone sets being supervised.

The collation circuit 23 retrieves the limited portable telephone information management table 22, in order to collate whether or not the information proper to the portable telephone set sent from the call signal detection circuit 25 is a call for a portable telephone set it is supervising.

If the collation circuit 23, retrieving and collating the limited portable telephone information management table 22, finds that the portable telephone set exhibiting coincidence is under its supervision, the collation circuit 23 sends an information on the supervising number of the portable telephone set in question and an output command for the replying message to a reply message assembling circuit 24.

On reception a reply message output command from the collation circuit 23, the reply message assembling circuit 24 read out an information of the reply message from the limited portable telephone information management table 22, using the supervising number of the portable telephone set as a key.

The reply message assembling circuit 24 also receives data on current train operating state form the train operation information storage circuit 27 to insert the received data in the reply message.

The reply message assembling circuit 24 assembles the reply message and synthesizes digital data having of a voice signal format to send the synthesized digital data to a reply message issuing circuit 26.

On reception of the digital data of the reply message, the reply message issuing circuit 26 confirms reception of the incoming of a call signal from the base station 5 of FIG. 1 and, after sending out a reply message for a pre-set time duration, such as by repeating the reply announcement twice, opens a channel.

The reply message send-out circuit 26 sends a reply confirmation control signal, digital information of the reply message and the control signal for opening the channel, to the channel codec 17.

The channel codec 17 converts the digital information and the control signal from the reply message issuing circuit 26 into an information format that permits reception by the base station to send the signal as a transmission digital signal to a transmission circuit 16.

The transmission circuit 16 modulates and amplifies the transmission digital signal from the channel codec 17 to send the modulated and amplified signal to the power amplifier 15.

The power amplifier 15 amplifies the signal received from the transmission circuit 16 to send the amplified signal to the duplexer 13, which then feeds the signal from the power amplifier 15 to the antenna outside the carriage 6. The antenna 12 outside the carriage 6 transmits a radio wave containing the reply message signal to the base station 5.

Figure 3:
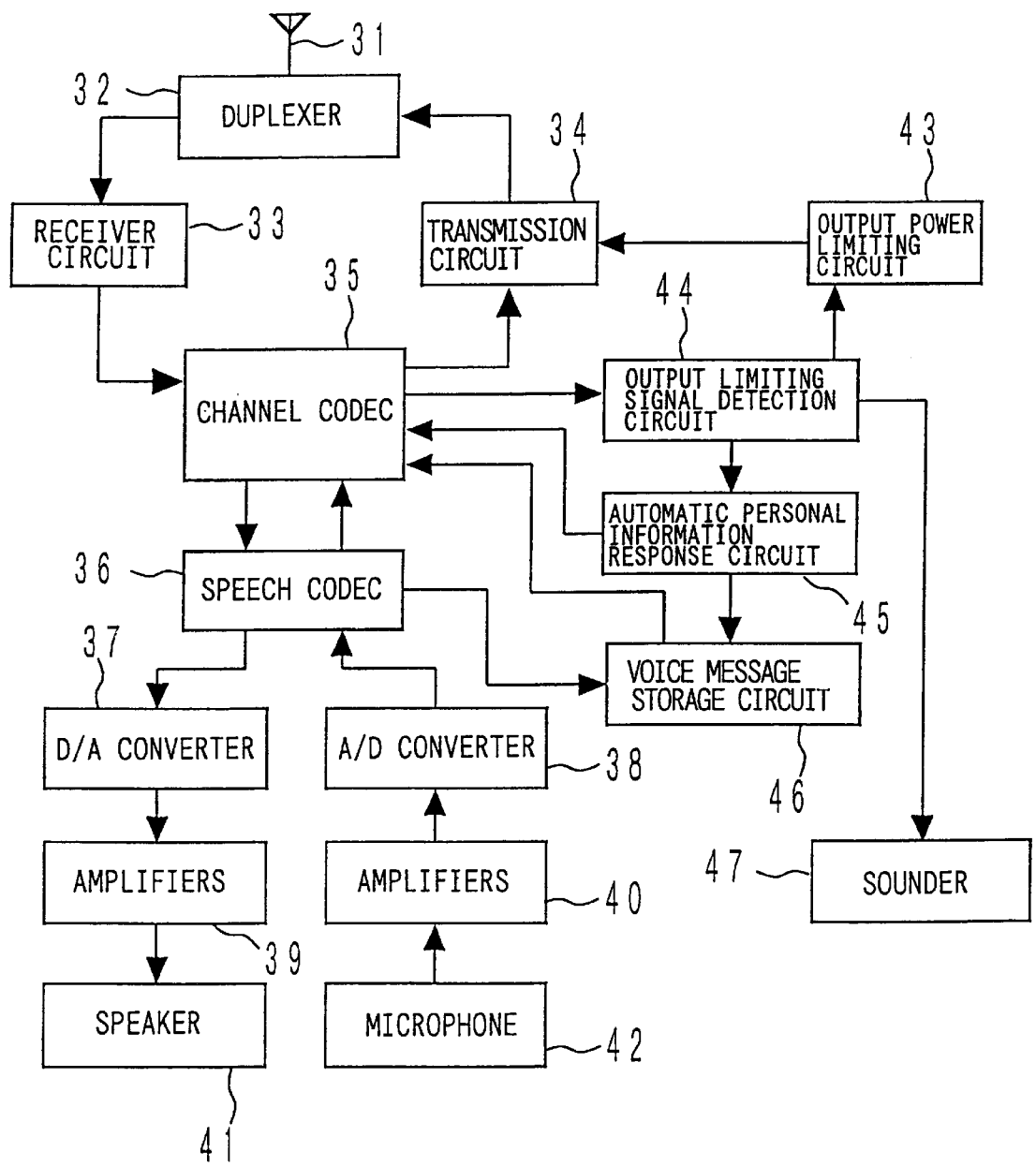
FIG. 3 shows the structure of a portable telephone output limiting management device in an embodiment of the present invention.

FIG. 3 shows an illustrative structure of the portable telephone set 4 according to an embodiment of the present invention. Referring to FIG. 3, the portable telephone set 4 includes an antenna 31, a duplexer 32, a receiver circuit 33, a transmission circuit 34, a channel codec 35, a speech codec 36, a D/A converter 37, an amplifier 39, a speaker 41, an A/D converter 38, an amplifier 40 and a microphone 42.

A signal transmitted from the antenna 3 in the carriage 6 of FIG. 1 for limiting the outputting of a radio wave is received by the antenna 31 and converted into electrical signal which is routed to the duplexer 32. The duplexer 32 separates the electrical signal fed from the antenna 31 to send the separated electrical signal to the receiver circuit 33. The receiver circuit 33 demodulates the electrical signal sent from the duplexer 32 to send the received digital data to the channel codec 35.

The channel codec 35 synchronizes the received digital data from the receiver circuit 33 to extract the information portion containing the significant information to send the digital data of the information part to the speech codec 36 and to an output limiting signal detection circuit 44.

The output limiting signal detection circuit 44 receives the digital data from the channel codec 35 to check whether or not there is set in the received digital data the information commanding the output limitation.

On detection of the output limiting command information, the output limiting signal detection circuit 44 sends a command for limiting transmission power to an output power limiting circuit 43, while sending a command to sounder 47 for a single tone ringing in order to apprise the owner of the portable telephone set 4 of the fact that the output limitation has been initiated. The output limiting signal detection circuit 44 also issues a commands for sending out a identification information containing the telephone number and the inherent information proper to the portable telephone set 4 to an automatic personal information response circuit 45.

On reception of the command for transmitting the personal information from the output limiting signal detection circuit 44, the automatic personal information response circuit 45 sends the digital data of the personal information to the channel codec 35.

If data of the voice message is registered in the portable telephone set from the outset, the automatic personal information response circuit 45 issue a command sending out of the digital data of the voice message to a voice message storage circuit 46, after sending the digital data of the personal information.

The voice message storage circuit 46 receives a command for sending out the digital data of the voice message from the automatic personal information response circuit 45 to send out the digital data of the voice message stored in the channel codec 35.

The voice message storage circuit 46 stores the digital data of the voice message.

With respect to preparing digital data of the voice message, a voice signal is inputting to the microphone 42 which then converts the speech into electrical signals to be sent to the amplifier 40. The amplifier 40 amplifies the voice electrical signals from the microphone 42 to send the amplified signals to the A/D converter 38. The latter samples the analog signals, amplified by the amplifier 40, at e.g., 8 kHz for conversion into digital signals which are routed to the speech codec 36.

The speech codec 36 encodes the speech using, for example, the vector ring excitation linear prediction encoding system. The speech codec 36 routes the encoded data to the voice message storage circuit 46. The latter stores the digital signals from the speech codec 36. The time during which the voice data is to be stored depends on the memory capacity of the voice message storage circuit 46. In the present embodiment, it is presupposed that the voice data continuing for three to five seconds is to be stored.

The operation of the first embodiment of the present invention is explained below.

Referring to FIG. 1, an output limiting signal is transmitted at all times from the antenna in the carriage 3 provided in the electric rolling stock 6. The output limiting signal is sent out at a low intensity that permits reception only in the carriage, such as at transmission power of about 10 mW. For prohibiting the output limiting signal from leaking to outside, the window portion of the electric rolling stock 6 is preferably shielded.

When entering the inside of the electric rolling stock 6, the portable telephone set 4 receives the output limiting command signal, transmitted from the antenna in the carriage 3, to enter the output limiting mode. The portable telephone set 4, which has entered into the output limiting mode, halts direct data exchange through a wireless communication with the base station 5.

For indicating to the portable telephone output limiting management device 2 that the output limiting mode has been initiated, the portable telephone set 4 sends out to the antenna in the carriage 3, with an radio wave signal of a low electric power, the fact that the output limiting mode has been initiated, and the notification portable telephone identification information, made up of the supervising number and the telephone number of the portable telephone set, reply message and the communication information flag.

The portable telephone output limiting management device 2 receives, via the antenna in the carriage 3, the information sent out by the portable telephone set 4 (the fact that the output terminating mode has been initiated and the notification portable telephone identification information) to update and register the contents of the limited portable telephone information management table 22.

From this time on, the portable telephone output limiting management device 2 recognizing that the portable telephone set registered in the limited portable telephone information management table 22 is to be supervised by the portable telephone output limiting management device responds to a call signal sent from the base station 5, in place of the portable telephone set, until the latter exits the carriage.

Referring to FIG. 4, there is registered, in the limited portable telephone information management table 22 in the portable telephone output limiting management device 2, informations on the portable telephone sets placed under output limitation under the supervision of the portable telephone output limiting management device 2.

The figures from 1 to 15 on the leftmost column denote the supervising numbers. In the portable telephone output limiting management device 2 of the present embodiment, 15 portable telephone sets can be supervised simultaneously. Of course, the maximum value of the supervising number is not limited to 15.

The portable telephone set supervising information on the next column is the information proper to the portable telephone sets being supervised. When the portable telephone set is called from the base station, the contents of the inherent information of the portable telephone set are sent from the base station.

The portable telephone number is the telephone number of the portable telephone set itself.

As for the voice message, if the voice digital data for response is recorded in the portable telephone set from the outset, the portable telephone output limiting management device 2 takes over the voice digital data from the portable telephone set 4 to effect storage thereof in this table. Although the alphabetical letters are used for convenience, it is digital data encoded by the speech codec that are actually recorded.

The notification information flag is the information specifying action pattern with which the portable telephone output limiting management device 2 is to response to a call signal sent from the base station 5. This notification information flag is stored in the portable telephone set 4 and which are automatically sent out by the automatic personal information response circuit 45. Based on the content of the notification information flag, the reply message assembling circuit 24 in the portable telephone output limiting management device 2 assembles the contents of the reply message.

The contents of the notification information flag has the following meanings:

Number: The number of the portable telephone set is notified.
Voice: The voice message is notified.
Site: The current site is notified.
Name of Line: The specified electric rolling stock in which the portable telephone set is located is notified.
None: The automatic response function by the portable telephone output limiting management device 2 is suppressed.

FIG. 5 is a schematic view for illustrating an embodiment of the present invention, and schematically shows the running state of a electric rolling stock embodying the present invention. FIG. 5 shows which message is returned by the portable telephone output limiting management device 2 depending on the condition of the electric rolling stock. In both the examples 1 and 2, the electric rolling stock is a train going up of Keihin-Touhoku Line. In Example 1 of FIG. 5a, the electric rolling stock is nearing Yokohama station. In Example 2 of FIG. 5b, the electric rolling stock is running somewhere between Yokohama station and Higashi-Kanagawa station.

Referring to FIGS. 4 and 5, an example of assembling a response message by the reply message assembling circuit 24 of the portable telephone output limiting management device 2 is explained. Meanwhile, the operating state of the electric rolling stock is received from the train control device 28 so that the latest information is stored at all times in the train operation information storage circuit 27. The reply message assembling circuit 24 optionally acquires the information on train operation from the train operation information storage circuit 27.

Since the communication information flag of the portable telephone set having the supervising number of '4' is "none", no response is made by the portable telephone output limiting management device 2 even if it detects the call signal addressed to the portable telephone set with the supervising number of '4'. In such case, a routine non-response message: "The telephone set to which you dialed is now not live since it is outside the reach of radio waves or has the power source turned off." is announced through a mobile communication to an originator network.

The portable telephone sets having the supervising numbers '1', '3', '6' and '8' have the numbers of the communication information flags ON (indicated with circle marks in FIG. 4). On detecting the call to the supervising number '6', the portable telephone output limiting management device 2 automatically replies by stating "The user is on board a electric rolling stock and cannot reply by telephone. Please phone later on".

The portable telephone set with the supervising number of '2' has the voice flag and the site of the communication information flag both ON. If the portable telephone output limiting management device 2 detects a call to the supervising number '2' and the case is the example 1 of FIG. 5a, it automatically responds by stating "This is Sato speaking. I am on board the electric rolling stock and cannot reply. The train is nearing Yokohama station".

If the site of the portable telephone set having the supervising number of '2' corresponds to the case of Example 2 of FIG. 5b, the portable telephone output limiting management device 2 automatically responds by stating "This is Sato speaking. I am on board the train and cannot reply. The train is now somewhere between Yokohama station and Higashi-Kanagawa station".

The portable telephone sets having the supervising numbers of '4' and '9' have the voice flag and the name of the line flag both ON. If the portable telephone output limiting management device 2 detects a call to the supervising number 4, for example, and the case is the example 1 of FIG. 5a, it automatically responds by stating "This is Suzuki speaking I am on board the train up of the Keihin-Touhoku line and cannot reply by telephone". In the case of example 2 of FIG. 5b, since the name of the line of the train is the same as in example 1, the portable telephone output limiting management device 2 automatically responds by stating "This is Suzuki speaking. I am on board the train going on the Keihin-Touhoku line and cannot reply by telephone".

The portable telephone set having the supervising number '7' has the voice, current site and the name of line of the communication information flags all ON. If the portable telephone output limiting management device 2 detects a call to the supervising number '7' and the case is that of example 1 of FIG. 5a, it automatically responds by stating "This is Tanaka speaking. I am on board the train and cannot reply by telephone. The train is a train going up of the Keihin-Touhoku line and is nearing Yokohama station". If the site of the portable telephone set having the supervising number '7' is the case of example 2 of FIG. 5b, the portable telephone output limiting management device 2 automatically responds by stating "This is Tanaka speaking. I am on board the train and cannot reply by telephone. The train is a train going up on the Keihin-Touhoku line and is somewhere between Yokohama station and Higashi-Kanagawa station".

The portable telephone set 4, placed under supervision by the portable telephone output limiting management device 2, sends out no other a power downed radio wave as long as it is receiving the output limiting command information sent out by the antenna in the carriage 3. Stated differently, the portable telephone set 4 is not in a position of directly exchanging data with the base station 5.

If the portable telephone set exits the carriage, it does receive any output limiting command information. At this time, the portable telephone set 4 verifies that it has exited the output-limited area. In this case, the portable telephone set 4 transmits its portable telephone identification information and the information that it switches from the output-limited mode to the normal operating mode, that is an output limited mode relinquishing notification, with a medium power, for example, an output of the order of 50 mW.

The output limited mode relinquishing notification, issued by the portable telephone set 4 exiting the carriage, is received by the portable telephone output limiting management device 2 via the antenna outside the carriage 1.

On reception of the relinquishing notification from the portable telephone set 4, the portable telephone output limiting management device 2 checks whether or not the portable telephone set which has issued the relinquishing notification is the portable telephone set under its supervision. If the result is YES, the portable telephone output limiting management device 2 sends the confirmation of the relinquishing notification to the portable telephone set to delete the information on the portable telephone set in question from the limited portable telephone information management table 22.

On reception of the confirmation of the relinquishing notification, the portable telephone set 4 switches from a output-limited mode to a normal operating mode and receives a radio wave from a base station to effect position registration.

Although the foregoing embodiment refers to application of the present invention to an electric rolling stock, the present invention can also be applied to other output-limited sites, such as a cinema house, theater, hospital or library, in which the use of the portable telephone set is inhibited or is not desirable as manner. In a cinema house or a theater, such a response as "I am enjoying a drama XXX in a theater and cannot reply to the call. The next rest time is from AA hour to BB minute to AA hour to CC minute. Please call during this time" can be sent to an originator who called the portable telephone set in the output-limited state.

The second embodiment of the present invention is explained. FIG. 6 shows the structure of the second embodiment of the present invention. Referring to FIG. 6, the present second embodiment can roughly be divided into two device configurations, one of which is such a one made up of an antenna outside the carriage 51, a portable telephone output limiting management device 52 and an antenna in the carriage 53 and having the functions of limiting the use of the portable telephone set and of advising the portable telephone set in the carriage of the fact of incoming of a call from the base station 55 to the portable telephone set being supervised by the device configuration. The other is a portable telephone set 54.

The portable telephone set 54 has the function of receiving and discriminating an output limitation signal from the portable telephone output limiting management device 52 (signal commanding suppression of transmitting radio wave) for automatically sending back the portable telephone identification information.

The above-described first embodiment is applied with advantage to means of public traffic, such as electric rolling stocks or buses, and is particularly effective in case the use of the portable telephone set is inhibited for the entire vehicle.

On the other hand, the second embodiment is applied with advantage to the case of an electric rolling stock where the use of the portable telephone set is inhibited in the seated passenger carriage but is permitted in a deck etc, such as on a train of the shinkansen line or in a limited express train.

If the portable telephone set 54 is outside the electric rolling stock 56, such as when the owner of the portable telephone set 54 is not on board the electric rolling stock 56, the portable telephone set 54 exchanges the information directly with the base station 55 to receive services of the speech communication.

When the portable telephone set 54 is on board the electric rolling stock 56, it receives an output-limited signal transmitted from the antenna in the carriage 53 to halt the communication with the base station 55 over a radio path.

The portable telephone set 54 then transmits to the portable telephone output limiting management device 52 the fact that it has halted wireless communication with the base station 55, and the inherent identification information for the portable telephone set, as well as the information on e.g., the telephone number and the voice message.

From this time on, the portable telephone set 54 is able to output a radio wave only at a low powered transmission level until the time the set 54 exits the call-inhibited carriage of the electric rolling stock 56 (passenger carriage). For example, the outputting of the radio wave large than the output of, for example, 10 mW, is halted.

On reception of the portable telephone identification information from the portable telephone set 54 and signals such as the telephone number or the voice message via the antenna in the carriage 53, the portable telephone output limiting management device 52 recognizes that the call is incoming to the portable telephone set 54 to await a user of the portable telephone set 54 moving to the deck 58.

If the user of the portable telephone set 54 has moved to the deck 58, the portable telephone output limiting management device 52 causes handover from the portable telephone set 54 to a repeater for the portable telephone set 59. The repeater device for the portable telephone set 59 receives and amplifies weak radio wave transmitted by the portable telephone set 54 to send the amplified radio signal to the base station 55 using an antenna outside the carriage 60 so that the portable telephone set 54 now can have a communication with the originating side via the repeater device 59.

Figure 7:
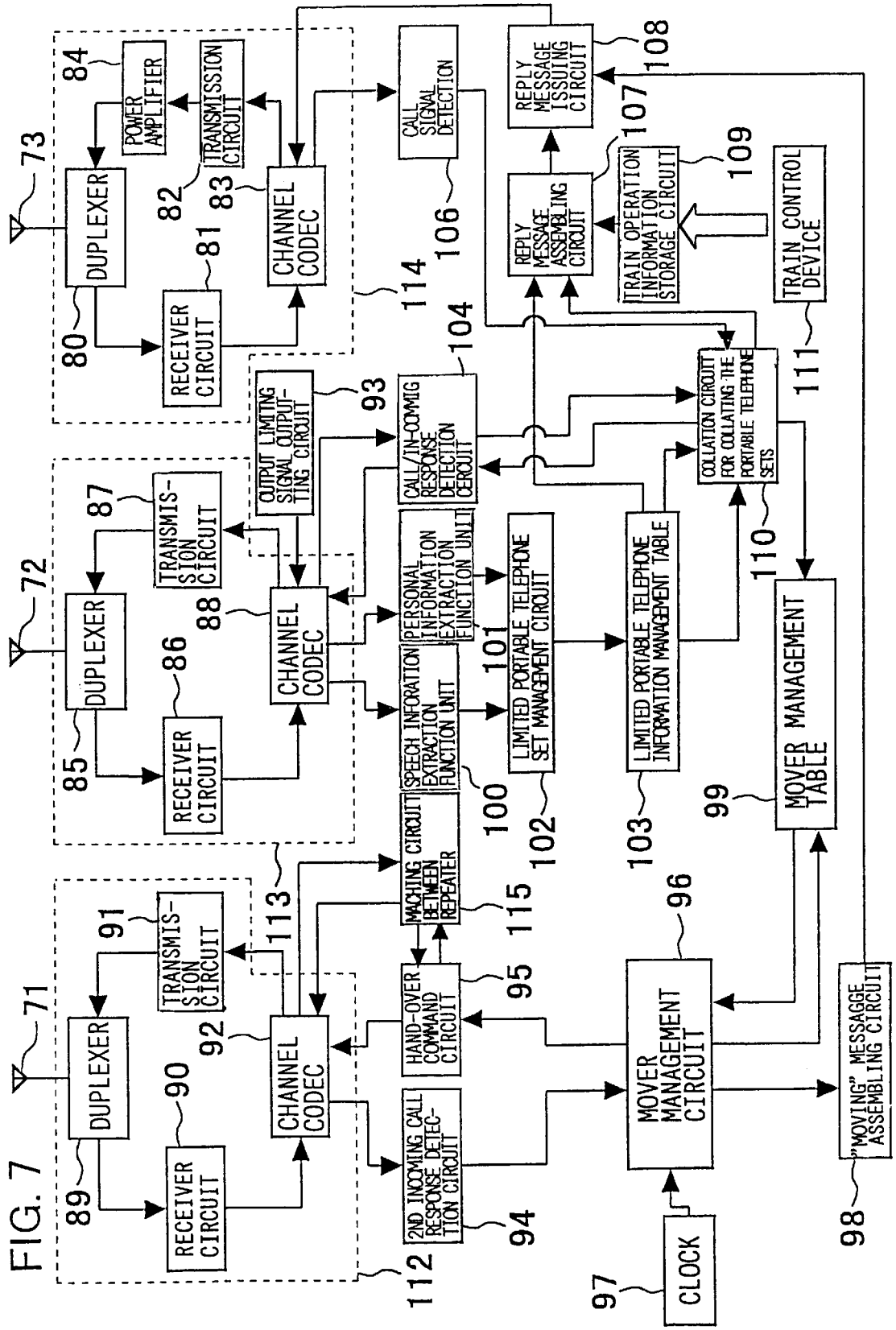
FIG. 7 shows the structure of a portable telephone output limiting management device in the second embodiment of the present invention.

FIG. 7 is a block diagram showing the structure of a portable telephone output limiting management device 52 according to a second embodiment of the present invention.

Referring to FIG. 7, a circuit block 113, made up of an antenna in the carriage 72, a duplexer 85, a receiver circuit 86, a transmission circuit 87 and a channel codec 88 communicates with a portable telephone set 54 in the carriage of an electric rolling stock 56. The antenna in the carriage 72 corresponds to the antenna in the carriage 53 in FIG. 6.

A circuit block 114, made up of an antenna outside the carriage 73, a duplexer 80, a receiver circuit 81, a power amplifier 84, a transmission circuit 82 and a channel codec 83 communicates with the base station 55 in FIG. 6. The antenna outside the carriage 73 corresponds to the antenna outside the carriage 51 in FIG. 6.

A circuit block 112, made up of an antenna outside the carriage 71, a duplexer 89, a receiver circuit 90, a transmission circuit 91 and a channel codec 92 communicates with a portable telephone set 54 in the inside of a deck 58. The antenna outside the carriage 71 corresponds to the antenna in the carriage 57 in FIG. 6.

An output limiting signal outputting circuit 93 sends a digital information commanding the output limitation of radio wave of the portable telephone set to the channel codec 88. The channel codec 88 converts the output limiting signal from the output limiting signal outputting circuit 93 into an information format signal that can be received by the portable telephone set to send the converted signal to the transmission circuit 87.

The transmission circuit 87 modulates and amplifies the transmission digital signals from the channel codec 88 to send the resulting signal to the duplexer 85. The duplexer 85 transmits the signal from the transmission circuit 87 to send it to the antenna in the carriage 72, which then transmits the signal from the transmission circuit 87 into the inside of the electric rolling stock.

The antenna in the carriage 72 receives a radio wave carrying a portable telephone identification information proper to the portable telephone set and the information such as the telephone number or the voice message, transmitted by the portable telephone set adapted to cope with the portable telephone output limiting management device accommodated in the electric rolling stock, and converts radio wave into electrical signal, which then is sent to the duplexer 85.

The duplexer 85 separates the electrical signal sent from the antenna in the carriage 72 to send the separated electrical signal to the receiver circuit 86. The receiver circuit 86 demodulates the electrical signals sent from the duplexer 85 to convert the demodulated signals into digital data which are sent to the channel codec 88.

The channel codec 88 synchronizes the received digital data sent from the receiver circuit 86 to extract an information portion carrying the significant information to send the digital data of the information portion to a speech information extraction function unit 100 and to a personal information extraction function unit 101.

The personal information extraction function unit 101 extracts the portable telephone identification information, incoming call permission information and the information on the telephone number to send the extracted information to the limited portable telephone information management table 102.

The speech information extraction function unit 100 extracts information on the voice message from the digital data sent from the channel codec 88 to send the extracted information to the limited portable telephone information management table 102.

The portable telephone set identification information and the information on the incoming permission flag and the telephone number, sent from the personal information extraction function unit 101, are stored in a limited portable telephone information management table 103.

The limited portable telephone information management table 103 is comprised of a memory device, which is under the supervision by the portable telephone output limiting management device 52, and which stores the portable telephone set identification information of the totality of radio wave outputting limited portable telephone sets, the information on the telephone number and the information on the voice message.

FIG. 9 schematically shows the portable telephone identification information stored by the limited portable telephone information management table 103, the information on the telephone number, the information on the voice message, and a typical incoming call permission flag as later explained.

A train operation information storage circuit 109 receives data on the incessantly changing operating state of the electric rolling stocks from the train control device 111 to store the latest information at all times.

The portable telephone output limiting management device 52 of FIG. 6 perpetually monitors the radio wave carrying the call information (incoming signal) information to the portable telephone set being supervised by the own device. If the portable telephone output limiting management device 52 is called out, the portable telephone output limiting management device 52 operates differently depending on the contents of the incoming permission flag stored in the limited portable telephone information supervising table 103.

If the incoming permitting flag stored in the limited portable telephone information supervising table 103 is off, the portable telephone output limiting management device 52 operates in the same manner as in the first embodiment described above.

That is, the portable telephone output limiting management device 52 returns a response to the base station 55 to take the place of the portable telephone set 54 in the carriage. The configuration for realization of this function is as follows:

It is the antenna outside the carriage 73 of FIG. 7 that corresponds to the antenna 51 outside the carriage 56. The antenna outside the carriage 73 receives radio wave from the base station 55 of FIG. 6 to convert the radio wave into electrical signals which are sent to the duplexer 80. The duplexer 80 separates the electrical signals sent from the antenna outside the carriage 73 to send the separated electrical signals to the receiver circuit 81. The receiver circuit 81 demodulates the electrical signals sent from the antenna outside the carriage 73 to route the received digital data to the channel codec 83. The channel codec 83 synchronizes the received digital data sent from the receiver circuit 81 to extract the information portion to send the extracted information portion of the digital data to a call signal detection circuit 105. The call signal detection circuit 105 detects the call signal to capture the information proper to the portable telephone set to send the captured information to the collation circuit 110 for the portable telephone sets being supervised.

In order to collate whether the information proper to the portable telephone set sent from the call signal detection circuit 105 is a call addressed to the portable telephone set supervised by the own portable telephone output limiting management device, a collation circuit 110 for the portable telephone set being supervised retrieves the limited portable telephone information management table 110. If, as a result of collation, the matching circuit 110 for the portable telephone set being supervised finds that the portable telephone set found to be coincident is placed under supervision of the own portable telephone output limiting management device, the collation circuit 110 further checks the incoming permission flag of the limited portable telephone information supervising table 103.

In the following, the condition under which an incoming permission flag in the limit portable telephone at management table 110 is off is explained.

Since the incoming flag is off, the portable telephone output limiting management device 52 returns a reply to the base station 55 to take the place of the portable telephone set 54.

The matching circuit 110 sends the information on the supervising number of the portable telephone set in question and an output command for a reply message to a reply message assembling circuit 107. On reception of a reply message output command from the matching circuit 110, the reply message assembling circuit 107 captures data of the reply message from the limited portable telephone information supervising table 103, using the supervising number of the portable telephone set as a key. The reply message assembling circuit 107 also receives data concerning the current train operating state from a train operating information storage circuit 109 to insert the data into a reply message. The reply message assembling circuit 107 assembles the reply message to synthesize digital data to be sent out as an image and routes the assembled digital data to a reply message send-out circuit 108.

The reply message send-out circuit 108, receiving the digital data of the reply message, responds to the incoming of the call-out signal from the base station 55 of FIG. 6 and, after sending out the reply message for a pre-set time interval, for example, after repeating the reply message twice, opens the network. The reply message send-out circuit 108 sends the incoming reply control signal, digital information of the reply information and the control signal for network opening to the channel codec 83.

The channel codec 83 converts the digital information and the control signal from the reply message send-out circuit 108 into an information format that permits the reception by the base station and sends the resulting information and signals as transmission digital signals to a transmission circuit 82. The transmission circuit 82 modulates and amplifies the digital signals for transmission from the channel codec 83 to send the resulting signals to the power amplifier 84. The power amplifier 84 amplifies the signals received by the transmission circuit 82 to send the amplified signals to the duplexer 80. The duplexer 80 sends the signals from the power amplifier 84 to the antenna outside the carriage 73. The antenna outside the carriage 73 transmits the radio wave carrying the signals from the power amplifier 84 to the antenna outside the carriage 73, which then transmits radio wave carrying the reply message to the base station 55.

On the other hand, if the incoming permitting flag stored in the limited portable telephone information management table 103 is on, an operation proper to the second embodiment of the present invention is carried out.

That is, the portable telephone output limiting management device 52 notifies to the portable telephone set 54 of FIG. 6 that a call is incoming. The portable telephone output limitation management device 52 then waits for the user of the portable telephone set 54 to move to the deck 58 of FIG. 6.

If the user of the portable telephone set 54 has moved to the deck 58, hand-over from the portable telephone set 54 to the repeater 59 occurs.

Since the time the portable telephone output limiting management device 52 communicates the incoming state to the portable telephone set 54 until the portable telephone set 54 moves to the deck 58, the portable telephone output limiting management device 54 continues to send the message running: "the portable telephone set is moving to a place which permits use of the set. Please wait for a while". The structure which implements this function is as follows:

It is the antenna outside the carriage 73 of FIG. 7 that corresponds to the antenna outside the carriage 51 of FIG. 7.

The antenna outside the carriage 73 receives radio wave from the base station 55 to convert it into electrical signal which is sent to the duplexer 80. The duplexer separates the electrical signal sent from the antenna outside the carriage 73 to send the separated electrical signal to the receiver circuit 81. The receiver circuit 81 demodulates the electrical signal sent from the duplexer 80 to send the received digital data to the channel codec 83. The channel codec 83 synchronizes the received digital data sent from the receiver circuit 81 to extract the information portion to send the extracted digital data of the information portion to a call signal detection circuit 106. The call signal detection circuit 106 detects the call signal to capture the information proper to the portable telephone set to send the information proper to the portable telephone set to the collation circuit 110. The matching circuit 110 retrieves the limited portable telephone information management table 103 in order to collate whether or not the information proper to the portable telephone set is the call to the portable telephone set supervised by the portable telephone output limiting management device. If it is found that, as a result of collation, the portable telephone set found to be coincident is placed under supervision of the own portable telephone output limiting management device, the matching circuit 110 further checks the incoming permission flag of the limited portable telephone information management table 103.

In the following, it is assumed that the incoming permission flag is on.

Since the incoming flag is on, the matching circuit 110 issues a command for notifying the portable telephone set of the fact of incoming to an call/incoming response detection circuit 104. In the following, it is assumed that, for convenience, the portable telephone set is a portable telephone set 54 of FIG. 6.

The call/incoming response detection circuit 104 is responsive to the command from the collation circuit 110 to generate a control signal for notifying the incoming to send the generated control signal to the channel codec 88. The channel codec 88 converts the control signal from the call/incoming response detection circuit 104 into an information form which permits reception by the portable telephone set 54, in order to send the converted signal as the digital signal for transmission to the transmission circuit 87. The transmission circuit 87 modulates and amplifies the transmission digital signals from the channel codec 88 to send the resulting signals to the duplexer 85. The duplexer 85 transmits the signals from the transmission circuit 87 to the antenna in the carriage 72. The antenna in the carriage 72 transmits the radio wave carrying the incoming information to the portable telephone set 54 to the portable telephone set 54 of FIG. 6. The radio wave sent out from the transmission circuit 87 has its transmission power limited and hence is of a low intensity.

On reception of the incoming information, the portable telephone set 54 actuates a vibrator for advising the user of the call incoming state. A user who has recognized the fact of incoming by the vibrations of the vibrator presses down the incoming button and moves to a site where a voice communication by the portable telephone set is permitted, such as the deck 58 of FIG. 6, as he or she carries the portable telephone set 54.

If there is an incoming call under output limiting control and a reply to the incoming call is made by a radio wave to the portable telephone output limiting management device 52, the portable telephone set 54 sends out the response with an radio wave of low intensity.

It is the antenna in the carriage 72 that corresponds to the antenna in the carriage 53 of FIG. 6. The antenna in the carriage 72 receives the radio wave from the base station 55 to convert it into electrical signals which are sent to the duplexer 80. The duplexer separates the electrical signals sent from the antenna in the carriage 72 to send the separated electrical signals to the receiver circuit 86. The receiver circuit 86 demodulates the electrical signals sent from the duplexer 85 to send the received digital data to the channel codec 83. The channel codec 83 synchronizes the received digital data sent from the receiver circuit 86 to extract the information portion containing the meaningful information to send the extracted digital data of the information portion to the call-out/incoming response detection circuit 104.

The call/incoming response detection circuit 104 detects the control signal of the response to the incoming to the collation circuit 110, from the information sent from the channel codec 88, to notify to the collation circuit 110 that a response has been made to the notification of the call incoming. On reception of the notification of the reply to the response from the call/incoming response detection circuit 104, the collation circuit 110 causes the portable telephone set management information of the portable telephone set 54 to be stored in a mover management table 99.

The mover management table 99 is comprised of a storage device and stores the portable telephone set discriminating information of the totality of the portable telephone sets placed under control by the portable telephone output limiting management device 52 and hence limited in the outputting of the radio wave and which have made responses to the incoming of the calls.

On reception of the response to the incoming from the portable telephone set 54, the portable telephone output limiting management device 52 performs the following operations until the time the portable telephone set 54 has moved to the site of the deck 58 of FIG. 6 and the portable telephone set 54 starts the talk.

A mover management circuit 96 checks the contents of the mover management table 99 at all times and, if the portable telephone set management information is newly written on a portable telephone set (referred to as the portable telephone set 54 as before), the current time is acquired from clock 97, and the time is stored in the mover management table 99 in association with the newly written portable telephone set management information. This time information is utilized as the time stamp of the time which has newly been placed under control by the mover management circuit 96.

If the portable telephone set 54 is newly registered in the mover management table, the mover management circuit 96 issues a command to send to a moving message assembling circuit 98 a message running "the portable telephone set is moving to a site where the portable telephone set can be used. Please wait for a while" to take the place of the portable telephone set 54.

On reception of the command from the mover management circuit 96, the moving message assembling circuit 98 synthesizes the digital data of a send-out image as the speech in the form of the guide information running: "This portable telephone set is moving to site which permits the use of the portable telephone set. Please wait for a while" and sends the synthesized digital data to the reply message issuing circuit 108.

On reception of the digital data of the reply message, the reply message issuing circuit 108 responds to the incoming of the call signal from the base station 55 of FIG. 6 to issue repeatedly a message running "The portable telephone set is moving to a site which permits the use of the portable telephone set. Please wait for a while".

The mover management circuit 96 waits until the portable telephone set 54 moves to the deck 58.

When moved to the deck 58, the user of the portable telephone set 54 a gain thrusts a button of the incoming response (second response to the call incoming). This second response to the incoming call is received using a room antenna 57 of FIG. 6 from the portable telephone set 54.

It is the antenna in the carriage 71 that corresponds to the antenna in the carriage 57 of FIG. 6. The antenna in the carriage 71 receives a radio wave from the portable telephone set 54 to convert it into electrical signal which are sent to the duplexer 89. The duplexer separates the electrical signal sent from the antenna in the carriage 71 to send the separated electrical signal to the receiver circuit 90. The receiver circuit 90 demodulates the electrical signal sent from the duplexer 89 to send the received digital data to the channel codec 92. The channel codec 92 synchronizes the received digital data sent from the receiver circuit 90 to extract the information portion containing the meaningful information to send the extracted digital data of the information portion to a second incoming call response detection circuit 94.

The second incoming call response detection circuit 94 at all times detects the information of the second response to the incoming call transmitted in the deck 58, from among the received digital data sent from the channel codec 92, to notify the results of detection and the detected information on the management of the portable telephone sets to the mover management circuit 96.

The mover management circuit 96 on reception of the fact of detection of the second response to the incoming call and the portable telephone management information collates the received contents with the contents stored in the mover management table 99. In case of coincidence of the portable telephone management information, the mover management circuit 96 deems that the portable telephone set 54 has moved to the deck 58.

The mover management circuit 96 notifies a command of causing handover from the portable telephone set 54 to a radio communication channel of the room antenna 61 connected to the repeater for the portable telephone set 59 and the portable telephone management information to a hand-over command circuit 95.

The mover management circuit 96 issues a command to a moving message assembling circuit 98 to halt the transmission of the "moving" message.

The mover management circuit 96 deletes the portable telephone set management information stored in the mover management table 99.

On the other hand, a matching circuit 115 among repeater devices has periodic communication with the repeater 59 to pick up at all times a vacant channel on the room antenna side of the repeater set 59.

On reception from a handover command circuit 94 of the handover request and the portable telephone set management information of the moved set in question (portable telephone set), the matching circuit 115 requests the repeater 59 of FIG. 6 to establish a radio communication channel between the base station 55 and the repeater for the portable telephone set 59 of FIG. 6.

On completion of establishing the radio communication channel, the repeater 59 communicates the fact of channel establishment to the matching circuit 115. The matching circuit 115 recognizes that the preparation for handover of the portable telephone set has now been completed and communicates that effect to the hand-over command circuit 95.

On reception of the notification on the completion of handover preparation from the matching circuit 115, the hand-over command circuit 95 issues to the portable telephone set 54 the command information for handover to a vacant channel on the room antenna 61 of the repeater 59.

The portable telephone set 54 has communication with the repeater 59 via the room antenna 61. The repeater 59 first receives a radio wave with low power transmitted from the portable telephone set 54, then converts the wireless path to amplify the signals to establish connection with the base station 55 using the antenna outside the carriage 60.

The portable telephone set 54 has now established a radio communication channel with the base station 55 via the repeater 59 to enable a voice communication.

It is probable that, when the mover management circuit 96 is waiting for movement of the portable telephone set 54 to the deck 58, the portable telephone set 54 does not move to the deck 58 for prolonged time. In order to cope with this situation, the mover management circuit 96 checks the time stamp stored in the mover management table 99 and, if not less than three minutes, for example, have elapsed since reception of the first power limitation call incoming response, the mover management circuit 96 gives up control of the portable telephone set 54 to delete the information on the portable telephone set 54 from the mover management table to send out a message running "I cannot reply to the call now" from the moving message assembling circuit 98 to disconnect the radio network between the base station 55 and the portable telephone output limiting management device 52.

FIG. 8 is a block diagram showing the structure of the portable telephone set adapted to cope with the portable telephone set output limiting management device and which has the functions of discriminating that an output limiting signal from the portable telephone output limiting management device is being received, automatically returning the portable telephone set discriminating information of the portable telephone set, detecting the incoming control signal during the output limiting mode and returning the information that the incoming call has been made during the output limiting time.

Referring to FIG. 8, an antenna 120, a duplexer 121, a receiver circuit 122, a transmission circuit 123, a channel codec 124, a speech codec 125, a D/A converter 126, an amplifier 128, a speaker 130, an A/D converter 127, an amplifier 129 and a microphone 131 are basic constituent elements of a conventional portable telephone set.

The structure characteristic of the second embodiment of the present invention is explained in the below. An antenna in the carriage 53 in FIG. 6 transmits a signal for limiting the outputting of a radio wave. The received signal is converted into electrical signals which are sent to the duplexer 121. The duplexer 121 separates the electrical signals sent from the antenna 120 to send the separated electrical signals to the receiver circuit 122. The receiver circuit 122 demodulates the electrical signals sent from the duplexer 121 to send the received digital data to the channel codec 124. The channel codec 124 synchronizes the received digital data from the receiver circuit 122 to extract an information portion to send the digital data of the information portion to the speech codec 125 and to an output limiting signal detection circuit 133.

The output limiting signal detection circuit 133 receives digital data from the channel codec 124 to check whether or not a command of an output limitation is contained in the received digital data.

On detection of the output limiting command information, the output limiting signal detection circuit 133 sends a command for limiting the *transmitted power to an output power limiting circuit 132. For advising the owner (user) of the portable telephone set of the fact that the portable telephone set is in the output limiting state, the output limiting signal detection circuit 133 sends a command for ringing a single tone to instruct the automatic personal information responding circuit 134 to instruct transmission of the personal information containing the proper information of the portable telephone set and the information concerning the telephone number and the information of the call incoming permitting flag.

On reception of the transmission of the personal information, the automatic personal information responding circuit 134 sends the digital data on the personal information to the channel codec 124.

If data of the voice message is previously stored in the own portable telephone set, the automatic personal information responding circuit 134 instructs the voice message storage circuit 135 after sending out the digital data of the personal information. The voice message storage circuit 135 receives a command for sending out the digital data of the voice message from the automatic personal information responding circuit 134 to send out the digital data of the voice message stored in the channel codec 124.

The voice message storage circuit 135 is able to store the digital data of the voice message signal.

The voice signal of the digital data voice message is entered to a microphone 131 which then converts the voice signal into electrical signal which is sent to the A/D converter 127. The A/D converter 127 samples analog signal, amplified by an amplifier 129, at a sampling rate of, for example, 8 kHz, for conversion into digital signal, which is sent to the speech codec 124. The speech codec 124 encodes the speech using, for example, the vector ring excitation linear predictive coding system.

The speech codec 124 sends the encoded voice message signal to feed the voice message storage circuit 135, which then stores the digital signals from the speech codec 124.

The time during which to store voice data depends on the memory capacity in the voice message storage circuit 135. In the present embodiment, voice data continuing for 3 to 5 seconds, for example, is stored.

The portable telephone set of FIG. 2 of the second embodiment of the present invention is characterized in that it has the function of detecting and responding to the call incoming information from the portable telephone output limiting management device when the portable telephone set is in the output limiting mode. This function is explained in connection with respective blocks.

When the portable telephone set is in the output limiting mode, the portable telephone set of FIG. 8 awaits the incoming of the information indicating the incoming of a call during output limitation via antenna 120.

A radio wave transmitted from the antenna in the carriage 53 is received by the antenna 120 and converted into electrical signal which is sent to the duplexer 121. The duplexer separates the electrical signal sent from the antenna 120 to send the separated electrical signal to the receiver circuit 122.

The receiver circuit 122 demodulates the electrical signal sent from the duplexer 121 to send received digital data to the channel codec 124. The channel codec 124 synchronizes the digital data sent from the receiver circuit 122 to extract an information portion to send the received digital data to the output limiting signal detection circuit 133, speech codec 125 and to a detection circuit 138 adapted for detecting the call incoming during output limiting time.

The detection circuit 138 receives the digital data from the channel codec 124 to check whether or not the information indicating the incoming of a call during output limiting time is contained in the received digital data. On detection of the information indicating the incoming of a call during output limiting time, the detection circuit 138 activates a circuit for detecting the pressing of a response key to output limitation 140 to set the vibrator 137 into vibrations in order to apprise the user of the portable telephone set of the fact of incoming of a call.

If the user recognizes that the user is receiving a call and is willing to respond to the call, he or she presses down an response key 141. If the circuit for detecting the pressing of a response key to output limitation circuit 140 detects that the response key 141 is pressed down and issues a command to cause an output limiting time call incoming response issuing circuit 139 to return the output limiting time incoming call response to the output limiting time call incoming response issuing circuit 139.

The output limiting time call incoming response issuing circuit 139 sends digital data of the output limiting time call incoming response information to the channel codec 124. The channel codec 124 converts the control signal from the output limiting time call incoming response issuing circuit 139 into an information form at which permits reception by the portable telephone output limiting management device 52 of FIG. 6 to send the resulting transmission digital signals to a transmission circuit 123. The transmission circuit 123 modulates and amplifies the transmission digital signals from the channel codec 124 to send the resulting signals to the duplexer 121. The duplexer 121 transmits the output signals from the transmission circuit 123 to the antenna 120 which then transmits the radio wave carrying the output limiting time response signal to the portable telephone output limiting management device 52.

The operation of the second embodiment of the present invention is now explained.

Referring to FIG. 6, an output limiting signal is perpetually outputted from the antenna in the carriage 53 in the electric rolling stock 56 and the antenna in the carriage 57 in the deck 58. The output limiting signal is outputted at a low output of, for example, 10 mW, that can be received only in the carriage. The window portion of the electric rolling stock is preferably shielded to avoid the output limiting signal from leaking out of the carriage. On entrance into the inside of the electric rolling stock 56 or the deck 58, the portable telephone set 54 receives the output limiting command information transmitted from the antenna in the carriage 53 or the antenna in the carriage 57 to enter into the output limiting mode. When entering into the output limiting mode, the portable telephone set 54 halts the direct exchange through a wireless communication with the base station 55. For showing to the portable telephone output limiting management device 52 that it has entered into the output limiting mode, the portable telephone set 54 transmits to the antenna in the carriage 53 or to the antenna in the carriage 57 to enter into the output limiting mode. For notifying to the portable telephone output limiting management device 52 that the portable telephone set 54 has entered into the output limiting mode, the portable telephone set 54 transmits, with a radio wave of low intensity, such as 8 mW, to the antenna in the carriage 53 or to the antenna in the carriage 57, the fact of entrance to the output halting mode, and the notification portable telephone set identification information made up of the portable telephone set management number, telephone number, reply message, communication information flag and the incoming permission flag.

The portable telephone output limiting management device 52 receives the information sent from the portable telephone set 54, through the antenna in the carriage 53 or the antenna in the carriage 57, to update the contents of the limited portable telephone information supervising table 103.

The portable telephone output limiting management device 52 acts on the assumption that the portable telephone sets registered in the limited portable telephone information supervising table 103 are under its management and responds in place of the portable telephone sets to the call from the base station 55 until the portable telephone sets in question exit the electric rolling stock.

If the portable telephone set 54 is the portable telephone set adapted to cope with the output limiting time incoming function, and the incoming permission flag is previously set to ON, the portable telephone set 54 is responsive to the call from the base station 55 to prompt the user to move to, for example, the deck 58 where the portable telephone set can be used. On reception from the output-limited portable telephone set 54 of the incoming response transmitted with a radio wave of low intensity, the portable telephone set 52 transmits to the base station 55 a message on the fact of moving during the time it is moving from the use-limited site to the use-permitted site, such as the deck 58.

When moved to the deck 58, the user of the portable telephone set 54 again presses a reply response button by way of a second response to the incoming call. This second response to the incoming call is transmitted from the portable telephone set 54. On reception of the second incoming response, the portable telephone output limiting management device 52 verifies that the portable telephone set has moved to the use-permitted site to issue a handover command to the repeater 59. The portable telephone set 54 initiates a communication with the base station 55 via the repeater 59.

FIG. 9 shows an example of the management information of the limited portable telephone information management table 103 in a portable telephone output limiting management device 62 according to a second embodiment of the present invention.

In the limited portable telephone information management table 103, there is stored the information on the portable telephone set under current management on which output limitation is placed by the portable telephone output limiting management device 52.

Referring to FIG. 9, there is added to the limited portable telephone information management table 103 the site of storage of the incoming permitting flag in addition to the contents shown in FIG. 4. In FIG. 9, the incoming permitting flag, indicated by a circle mark, indicates the on-state (incoming permission).

The added incoming permission flags are explained. The incoming permitting flag is used for verifying whether or not, if call addressed to a portable telephone set 54 is requested from the base station 55 to the portable telephone output limiting management device 52, the information indicating the fact of incoming is to be communicated to the portable telephone set 54. For the portable telephone set, for which the incoming permission flag is set to off, the portable telephone output limiting management device 52 operates in the same fashion to the above-described first embodiment.

The portable telephone output limiting management device 52 communicates the fact of incoming to the portable telephone set 54 for which the incoming permitting flag is set to on. The portable telephone output limiting management device 52 performs control until movement to the deck 58 and until start of talk by the portable telephone set after its movement to the deck 58.

Although the second embodiment has been explained with reference to an electric rolling stock having a carriage in the inside of which use is limited and in a deck of which the use is permitted, the present invention is, of course, not limited to this electric rolling stock.

In FIG. 6, the antenna in the carriage 57 on the deck 58 and the antenna in the carriage 61 in the repeater for the portable telephone set may be unified, in which case the second response to the incoming call from the portable telephone set 54 is received by the antenna 61 and communicated from the repeater device 59 to the portable telephone output limiting management device 52.

The repeater device 59 and the portable telephone output limiting management device 52 may be interconnected by a cable rather than via a radio channel depending on usage.

A third embodiment of the present invention is explained. As the third embodiment, the structure and the operation of the repeater for the portable telephone set 59 is explained. The relay network is assumed to be a sole network.

Figure 10:
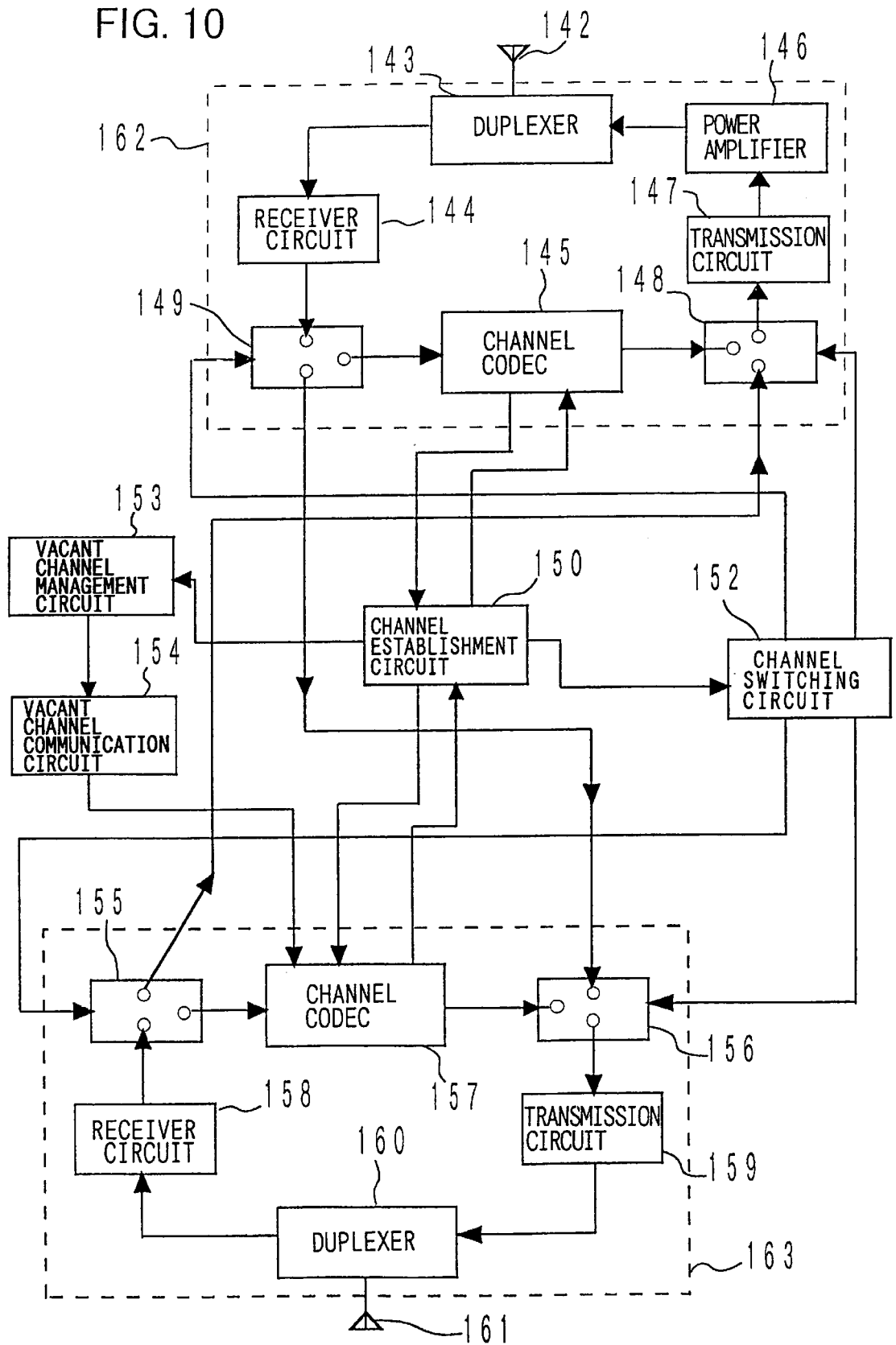
FIG. 10 shows the structure of a repeater for the portable telephone set according to a third embodiment of the present invention.

FIG. 10 shows an example of the structure of the repeater device shown in FIG. 6. The structure of the portable telephone output limiting management device shown in FIG. 7 is to be referred to in the following.

The relation of correspondence between the elements shown in FIG. 10 and those shown in FIG. 6 is explained. The antennas outside the carriage 60, 61 of FIG. 6 correspond to the antenna outside the carriage 142 and to the antenna in the carriage 161 of FIG. 10, respectively.

In the repeater for the portable telephone set, shown in FIG. 10, a circuit block 163 comprised of an antenna in the carriage 161, a duplexer 160, a receiver circuit 158, a transmission circuit 159, a channel codec 157 and path changeover switches 155, 156 communicate with the portable telephone output limiting management device 52 in the carriage of the electric rolling stock 56 or with the portable telephone set 54 in FIG. 6. The antenna in the carriage 161 is similar to the antenna in the carriage 61 in FIG. 6, as mentioned above.

A circuit block 162, made up of the antenna outside the carriage 142, a duplexer 143, a receiver circuit 144, a power amplifier 146, a transmission circuit 147 and a channel codec 145 communicates with the base station 55 shown in FIG. 6. The antenna outside the carriage 142 is similar to the antenna outside the carriage 60 in FIG. 6, as mentioned above.

The repeater for the portable telephone set has the function of relaying a radio wave of the portable telephone set in the electric rolling stock to a base station outside the electric rolling stock. To a radio channel for communication between the repeater and the portable telephone output limiting management device, referred to below as a "device control channel", a radio channel for communication between the repeater and the portable telephone set in the electric rolling stock, referred to below as an "inside communication channel", and a radio channel for communication between the repeater and the base station outside the electric rolling stock, referred to below as an "outside communication channel", different frequencies are assigned to avoid interference.

For communication with the base station outside the electric rolling stock, the repeater uses a radio wave of a high transmission power, such as 5W, obtained on amplification with a power amplifier 146. For communication with the portable telephone set in the electric rolling stock or with the portable telephone output limiting management device, the repeater uses a radio wave of low transmission power, such as 10 mW.

A vacant channel management circuit 153 supervises the vacant state of the radio channel, that is the inside communication channel, adapted for communicating with the portable telephone set in the electric rolling stock.

Within the vacant channel management circuit 153, there is provided a management table having a flag for managing the channel frequencies and use/non-use of the radio channels.

A vacant channel communication circuit 154 collects the information of the vacant channel from the vacant channel management circuit 153 to transmit the vacant channel information to the matching circuit 115 of the portable telephone output limiting management device, via channel codec 157, path changeover switch 156 and transmission circuit 159, using the device control channel.

On reception of a command for acquisition of the outside talk channel from the matching circuit 115 in the portable telephone output limiting management device, with the aid of the device control channel, a channel connection circuit 150 requests the base station 55 in FIG. 6 to establish the outside communication channel via the channel codec 145, the power amplifier 146 and the antenna outside the carriage 142.

Responsive to the request for establishment of the outside communication channel, the base station first allotts a non-used new radio channel and, after handover of the portable telephone set in the electric rolling stock, re-connects the suspended network to a newly acquired network with a reply message.

On reception from the base station 55 via the antenna outside the carriage 142, receiver circuit 144, bus changeover switch 149 and the channel codec 145, the network establishment circuit 150 communicates to the matching circuit 115 the fact that the outside talk channel has been established, using a device control channel.

The matching circuit 115 in the portable telephone output limiting management device verifies that the movable unit (portable telephone set) in question is readied for handover and advises a handover command circuit 95 that preparation for handover has now been made.

On reception of a notice on the completion of preparation for handover from the matching circuit 115, the hand-over command circuit 95 sends to the portable telephone set 54 a command information to execute a handover process to the vacant channel in the room antenna 161 in the repeater 71.

The channel connection establishment circuit 150 monitors the handover command outputted by the hand-over command circuit 95 of the portable telephone output limiting management device.

The channel connection establishment circuit 150 monitors the channel frequency of the inside communication channel of the handover destination to transmit the channel number designated as the handover destination to the vacant channel management circuit 153.

On reception of the information of the handover designating channel from the channel connection establishment circuit 150, the vacant channel management circuit 153 changes the flag of the specified channel in the management table from "out of use" to "in use".

On reception of the handover command for the portable telephone set from the portable telephone output limiting management device, the channel connection establishment circuit 150 communicates to the base station that the portable telephone set in the carriage is ready for handover and issues a path switching command to a network switching circuit 152.

The network switching circuit 152 has the function of switching signal pathes in the repeater through which flows the data.

Figure 12:
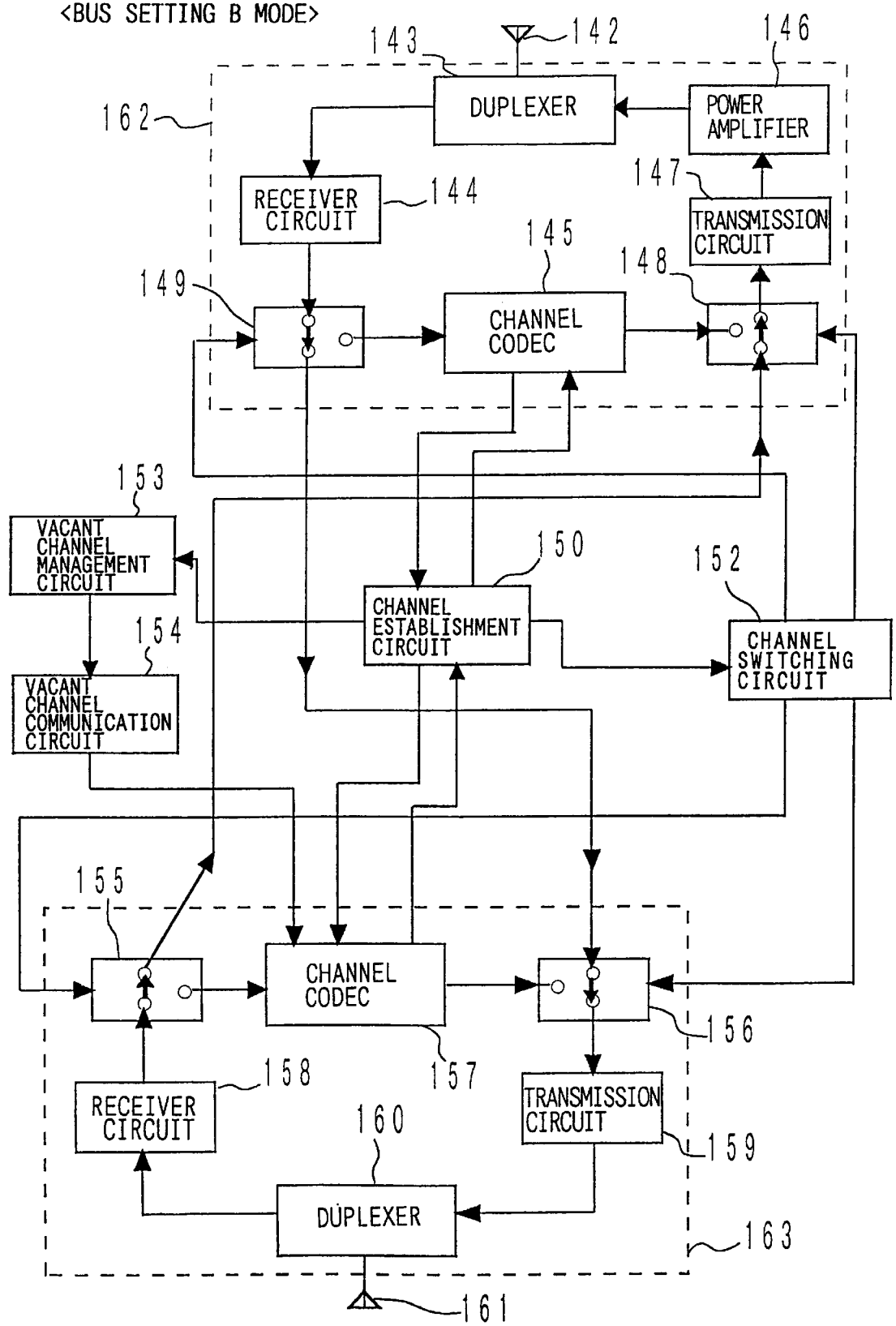
FIG. 12 shows the path setting (B mode) for a repeater for the portable telephone set according to the third embodiment of the present invention.

The mode in which the repeater for the portable telephone set is relaying the communication network of the portable telephone set is termed a "path setting mode B". FIG. 12 shows the corresponding setting of the path changeover switch.

Figure 11:
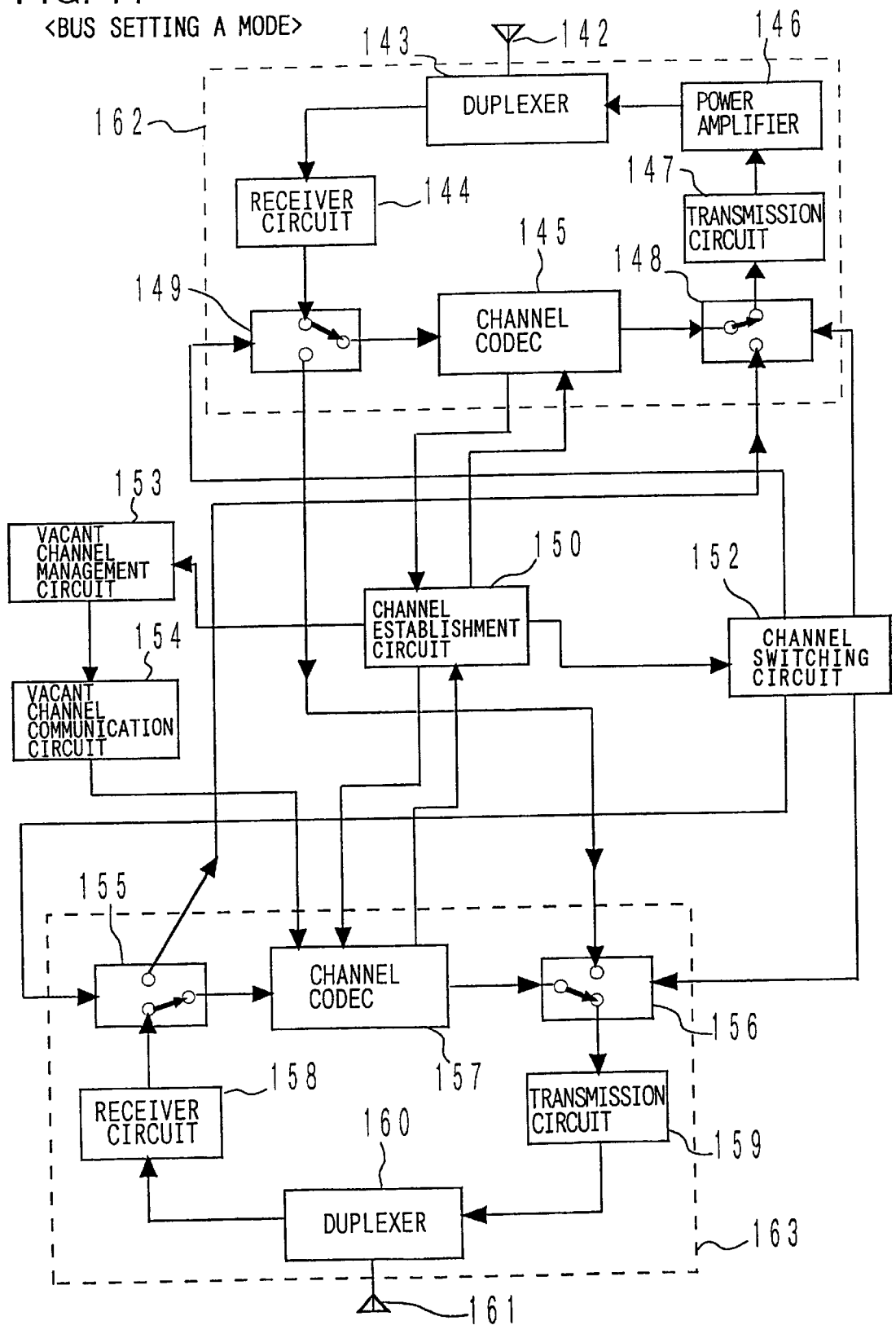
FIG. 11 shows the path setting (A mode) for a repeater for the portable telephone set according to the third embodiment of the present invention.

The mode in which the repeater for the portable telephone set is not relaying the communication network is termed a "path setting mode B". FIG. 11 shows the corresponding setting of the path changeover switch.

In the mode A of FIG. 11 communication with the base station is effected by the network connection establishment circuit 150 via the channel codec 145. The communication with the portable telephone output limiting management device is taken charge of by the channel connection establishment circuit 150 via the channel codec 157.

In the mode B of FIG. 12, an information sent from the base station via the outside communication channel is sent directly to the portable telephone set in the carriage via the transmission circuit 159 and the room antenna 161 through the inside communication channel without routing through the channel codec. In addition, a information sent from the portable telephone set in the electric rolling stock through the inside communication channel is directly sent by the outside communication channel to the base station via the transmission circuit 147, power amplifier 146 and the room antenna 142 to the base station instead of through the channel codec.

FIG. 13 shows the stationary state of a repeater for the portable telephone set according to a third embodiment of the present invention and the flow of the operation from channel connection establishment to the channel relaying operation.

In the steady state, the repeater 59 communicates the information on the vacant channel of the inside communication channel to the matching circuit 115 of the portable telephone output limiting management device 52 at a pre-set interval of, for example, 5 seconds. In the steady state, the internal bus of the repeater 59 is in the mode A.

The operation from a channel connection establishment to a channel relaying is explained below.

The portable telephone output limiting management device 52 issues a channel connection establishment request to the repeater 59. On reception of the network establishment request, the repeater 59 issues the channel connection establishment request to the base station 55. On reception of the channel connection establishment request, the base station 55 acquires a new radio channel to notify a successful channel acquirement of a vacant channel to the repeater 59.

On reception of the successful acquirement of a vacant channel, the repeater device 59 notifies the successful acquirement of a vacant channel to the portable telephone output limiting management device 52.

On notification of the successful acquirement of a vacant channel, the repeater device 59 monitors an arrival of a handover command which the portable telephone output limiting management device 52 issues to the portable telephone set 54.

In case of arrival of the handover command, the repeater 59 awaits a notification of a handover completion from the portable telephone set 54 in the carriage.

On reception of the handover completion from the portable telephone set 54 in the carriage, the repeater device 59 notifies the effect of handover completion to the base station 55 to switch the internal signal path to the mode B to enter into the channel relaying mode.

Thus, it is possible to have communicates in the carriage by the portable telephone output limiting management device under an output limited condition. The radio communication to outside the carriage can be had by the repeater device by exploiting the dedicated antenna outside the carriage. Moreover, since the transmitted power is amplified by the repeater device, the communication with the base station can be had under more meritorious conditions than when having direct communication from inside the carriage to the base station.

In the above-described third embodiment, the electric rolling stock having the repeater device in the use-limited carriage and in the use-permitted deck has been explained above. However, the present invention is not limited to the above electric rolling stock. Also, a repeater device may be further equipped with a handover command circuit explained in connection with the portable telephone output limiting device and a plurality of the repeater devices may be interconnected by radio channels or cables.

It is to be noted that the present invention may similarly be applied to a personal handyphone system, (PHS) or may also be a variety of mobile information terminals that can have communication with the base station as a mobile station. The setting or releasing of the output limitation of the portable telephone set can, of course, be effected by on/off of a predetermined switch accommodated on the portable telephone set.

[Effect of the Invention]

According to the present invention, as described above, if radio wave outputting is limited by a portable telephone output limiting management device, and a incoming is made to a portable telephone set, the portable telephone output limiting management device automatically takes the place of the portable telephone set to reply to the effect that the set is not in a position to talk by telephone, so that the originating party who has called the portable telephone set can clearly comprehend the reason the called party cannot talk by telephone.

According to the present invention, if an owner of a table telephone set who has turned the site of the notification information flag on is belayed for the appointed time and is moving on an electric rolling stock, the originating party is automatically informed of whereabouts of the owner the portable telephone set on calling by telephone. Thus, the originating party can roughly estimate the time of arrival of the party belayed for the appointed time to enhance the utility of the portable telephone set.

The meritorious effect and advantages of the present invention are further explained in detail. According to the present invention, since the outputting of the portable telephone set is automatically limited by the output limiting information issued from the portable telephone output limiting management device, it is unnecessary for the owner of the portable telephone set to perform power on/off operations of the portable telephone set when getting on board and alighting from the electric rolling stock. Moreover, the owner of the portable telephone set is apprised of the entrance to output limitation by the ringing of the sounder attached to the portable telephone set.

Moreover, if the owner of the portable telephone set is delayed for e.g., appointment, he or she is obliged to alight from the electric rolling stock to observe the manner because the use of the portable telephone set in the electric rolling stock is prohibited as a matter of manner despite his or her intention to communicate with the counter-party of appointment by telephone, thus increasing the delay. According to the present invention, since the portable telephone output limiting management device apprises the counter-party of the whereabouts of the user on the occasion of a call-out from the counter-party so that the latter is indirectly apprised of the status of the owner.

According to the present invention, it is possible to clearly demarcate the case in which the owner is on board an electric rolling stock and hence cannot reply to the call from the case in which a message running: "the portable telephone set is outside the reach of radio wave or the power is off so that it cannot reply to a call".

Also, according to the present invention, providing the portable telephone set having the function of accepting an incoming call under output-limited condition and the portable telephone output limiting management device having the function of advising the fact of the incoming call under an output-limited condition, it is possible to accept an incoming call under a condition of transmission power of a radio wave limited in an electric rolling stock where use of the portable telephone set is partially permitted, such as shinkansen line train or on a limited express train, such that, if the user moves to a use-permitted site in the train, he or she can have talks under output-limited conditions.

In addition, according to the present invention, since there is provided the function of automatically advising the fact of movement of the portable telephone set user to direct exchange with the base station during the time the user moves from the use-inhibited site the use-permitted site, the originating party is apprised of the reason the owner is belayed, while the owner may feel safe as he or she moves.

The present invention also has the meritorious effect that the user can have communications in the electric rolling stock under an output-limited condition. With the aid of the repeater device, radio communication with the outside can be had via the dedicated antenna outside the electric rolling stock and the transmission power is amplified by the repeater device. Thus, communication with a base station can be had under a more meritorious condition than if the user directly communicates with the base station from the inside of the carriage of the electric rolling stock.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A portable telephone set output limitation management device comprising:

means for sending out an output limitation command signal to a portable telephone set located in a site where use of a portable telephone set is limited through a first antenna accommodated in said use limited site;

means for receiving information proper to the portable telephone set transmitted from the portable telephone set via said first antenna, said portable telephone set having received the output limitation command signal and having entered into an output limiting state;

means to register said information and supervise the portable telephone set in the output limiting state;

a second antenna for having wireless communication with the base station; and means for retrieving a reply message from said registered information, said reply message responding to an incoming call to the portable telephone set and being transmitted automatically to the originator of said incoming call in place of a message from the portable telephone set.

2. The portable telephone set output limiting management device as defined in claim 1 wherein said information proper to the portable telephone set contains information identifying the portable telephone set, a management number of the portable telephone set, reply message information and a notification information flag for specifying a response pattern with which the portable telephone output limiting management device responds to a call from the base station;

there being provided in said output limiting management device means for registering and supervising the information in a table using the management number of the portable telephone set as a key; and wherein the reply message is automatically transmitted to said base station, based on a state of the notification information flag and the reply message information registered in the table, said reply message being transmitted in place of a message from the portable telephone set, responsive to the call from the base station to the portable telephone set, while said portable telephone set is in the output limiting mode.

3. The portable telephone set output limiting management device as defined in claim 1 wherein said notification information flag contains at least one of a plurality of information flags, there being in said plurality a flag for selecting possible presence of notification of a portable telephone set number pre-set in the portable telephone set, a flag for selecting possible presence of a voice message, a flag for selecting possible presence of notification of a current site, and a flag for selecting possible presence of suppression of an automatic reply function by the portable telephone output limiting management device.

4. A portable telephone output limiting management device comprising:

means for sending out an output limitation command signal for limiting outputting of a radio wave via a first antenna provided at a site where use of a portable telephone set is limited to a portable telephone set located in a site where use of a portable telephone set is limited;

means for receiving information proper to the portable telephone set, transmitted from the portable telephone set which has received the output limiting command signal to halt the communication with a base station so as to be in the output-limited state, via said first antenna, to register and supervise the portable telephone set in the output-limited state along with the information proper to the portable telephone set including call incoming permitting information;

a second antenna for having radio communication with said base station; and means for having reference to the incoming permitting information for information proper to the portable telephone set when there is the incoming call to the portable telephone set in the output-limited state from said base station, said means advising said portable telephone set of the fact of the incoming call in case the incoming of the call is permitted.

5. The portable telephone output limiting management device as defined in claim 4 comprising:

means for communicating to an originating side a message stating the incoming of a call by transmitting said message to the base station on communicating the incoming of the call to said base station.

6. The portable telephone output limiting management device as defined in claim 4 comprising:

means for registering the information proper to the portable telephone set on a management table, using a management number of the portable telephone set as a key, for management, said information including the portable telephone set identification information, portable telephone set number, reply message information, a notification information flag for specifying with which pattern the portable telephone output limiting management device is to reply to a call from the base station and an incoming permission flag; wherein if said incoming permission flag registered in said table is on, a call from the base station to a portable telephone set in the output limiting mode is caused to arrive at said portable telephone set and a reply message is automatically transmitted to said base station, based on a state of said notification information flag and the reply message information.

7. The portable telephone output limiting management device as defined in claim 4 further comprising:

control means for commanding hand-over to a radio channel of an antenna connected to a repeater device for a communication between the output-limited portable telephone set and a base station if a pre-set response from the portable telephone set via a third antenna provided in the use-permitted site for the portable telephone set, termed to as a second response to the incoming call, based on a detection of a fact that the user of the portable telephone set has moved to the usepermitted site; and means for requesting the repeater device to establish a radio channel between the base station and the repeater device responsive to said hand-over command.

8. The portable telephone output limiting management device as defined in claim 4 further comprising:

control means for performing time management processing to await reception of a response signal indicating that the user of the portable telephone set has moved to the use-permitted site after reception of an incoming response from the portable telephone set to the notification as to the incoming call to said portable telephone set, said control means initiating a disconnection of a channel connection to said base station if no response signal is obtained from said portable telephone set after awaiting for the preset time.

9. The portable telephone set output limiting management device as defined in claim 1 wherein said information proper to the portable telephone set contains information identifying the portable telephone set, a management number of the portable telephone set, reply message information and a notification information flag for specifying a response pattern with which the portable telephone output limiting management device responds to a call from the base station;

there being provided in said output limiting management device means for registering and supervising the information in a table using the management number of the portable telephone set as a key; and wherein the reply message is automatically transmitted to said base station, based on a state of the notification information flag and the reply message information registered in the table, said reply message being transmitted in place of a message from the portable telephone set, responsive to the call from the base station to the portable telephone set, while said portable telephone set is in the output limiting mode.-

10. The portable telephone set output limiting management device as defined in claim 1 wherein said notification information flag contains at least one of a plurality of information flags, there being in said plurality a flag for selecting possible presence of notification of a portable telephone set number pre-set in the portable telephone set, a flag for selecting possible presence of a voice message, a flag for selecting possible presence of notification of a current site, and a flag for selecting possible presence of suppression of an automatic reply function by the portable telephone output limiting management device.

11. The portable telephone output limiting management device as defined in claim 5 comprising:

means for registering the information proper to the portable telephone set on a management table, using a management number of the portable telephone set as a key, for management, said information including the portable telephone set identification information, portable telephone set number, reply message information, a notification information flag for specifying with which pattern the portable telephone output limiting management device is to reply to a call from the base station and an incoming permission flag; wherein if said incoming permission flag registered in said table is on, a call from the base station to a portable telephone set in the output limiting mode is caused to arrive at said portable telephone set and a reply message is automatically transmitted to said base station, based on a state of said notification information flag and the reply message information.

12. The portable telephone output limiting management device as defined in claim 5 further comprising:

control means for commanding hand-over to a radio channel of an antenna connected to a repeater device for a communication between the output-limited portable telephone set and a base station if a pre-set response from the portable telephone set via a third antenna provided in the use-permitted site for the portable telephone set, termed to as a second response to the incoming call, based on a detection of a fact that the user of the portable telephone set has moved to the usepermitted site; and means for requesting the repeater device to establish a radio channel between the base station and the repeater device responsive to said hand-over command.

13. The portable telephone output limiting management device as defined in claim 6 further comprising:

control means for commanding hand-over to a radio channel of an antenna connected to a repeater device for a communication between the output-limited portable telephone set and a base station if a pre-set response from the portable telephone set via a third antenna provided in the use-permitted site for the portable telephone set, termed to as a second response to the incoming call, based on a detection of a fact that the user of the portable telephone set has moved to the usepermitted site; and means for requesting the repeater device to establish a radio channel between the base station and the repeater device responsive to said hand-over command.

14. The portable telephone output limiting management device as defined in claim 6 further comprising:

control means for performing time management processing to await reception of a response signal indicating that the user of the portable telephone set has moved to the use-permitted site after reception of an incoming response from the portable telephone set to the notification as to the incoming call to said portable telephone set, said control means initiating a disconnection of a channel connection to said base station if no response signal is obtained from said portable telephone set after awaiting for the preset time.

15. A portable telephone output limiting management device as recited in claim 4, wherein said portable telephone set includes:

means for detecting a reception of the output limitation signal from the portable telephone output limiting management device;

means for sending back to the output limiting management device information proper to the portable telephone set; and means for detecting an incoming signal during an output limiting mode to send back an output-limiting-time-incoming information.

16. A portable telephone output limiting management device as recited in claim 4, wherein said portable telephone set includes:

means for detecting reception of the output controlling command information via said first antenna from the portable telephone output limiting management device;

means for limiting transmission power of the portable telephone set based on a result of detection of the output limitation command information;

means for transmitting information proper to the portable telephone set to the portable telephone output limiting management device under a limited transmission power;

means for notifying a user of the portable telephone set of an incoming signal by a vibrator if, during an output limiting mode, the incoming signal from the portable telephone output limiting management device is detected, said means detecting the actuation of an incoming reply key under output limitation mode, said means transmitting information on the incoming response information with limited transmission power to the portable telephone output limiting management device.

17. The portable telephone output limiting management device as defined in claim 4, wherein said output-limited portable telephone set includes:

means for transmitting a limitation command of transmission power to an output limiting circuit and for transmitting portable telephone set identification information and telephone number of the portable telephone set on detection of reception of said output limitation command information; and means for commanding voice data to be sent out if said voice data is pre-stored in voice message storage means;

wherein on entrance to an output limiting mode, a state of entrance to the output limiting mode and the portable telephone set identification information including the portable telephone set identification information of the portable telephone set, the portable telephone set number, information on the reply voice message, a notification information flag for designating with which response pattern the portable telephone output limiting management device is to reply to the call from the base station, and an incoming permission flag are sent with limited transmission power to the portable telephone output limiting management device.

18. A portable telephone output limiting management device as recited in claim 4, further comprising:

a repeater device comprising:

means for effecting relay connection of a radio channel between a portable telephone set under an output limitation mode and a base station; and means for accepting hand-over to said portable telephone set from said portable telephone output limiting management device.

19. A portable telephone output limiting management device as recited in claim 4, further comprising:

a repeater device comprising:

means for having communication with a matching circuit provided in the portable telephone output limiting management device to effect transmission/reception of information on a vacant channel, hand-over request and hand-over acceptance permission to accept a radio channel of the portable telephone set placed under the output limitation mode.

20. A portable telephone output limiting management device as recited in claim 4, further comprising:

a repeater device for relaying signals between the output-limited portable telephone set and the base station and which is configured for accepting handover of said portable telephone set from the portable telephone output limiting management device, comprising:

means for having communication via a cable or a radio path with said portable telephone output limiting management device;

different frequencies being allotted to an inside communication radio channel adapted for having communication between the portable telephone set and said base station and to an outside communication radio channel adapted for having communication with said base station;

a radio wave having a limited output being used for communication with said portable telephone set by said inside communication channel;

means for periodically communicating the information on the vacant channel of said inside communication channel under normal situation to said portable telephone output limiting management device;

means for sending out a network establishing request to said base station on reception of the network establishing request for the outside communication channel from said portable telephone output limiting management device, said means receiving a notification to the effect that a new radio channel has been acquired at said base station to notify the effect of acquirement of the outside communication channel to said portable telephone output limiting management device; and means for notifying the effect of hand-over completion to said base station on reception of the notification of the hand-over completion from said portable telephone set if a hand-over command has previously been issued from the portable telephone output limiting management device to the portable telephone set, for switching to relaying communication between said portable telephone set and the base station.

21. A portable telephone output limiting management device as recited in claim 4, further comprising:

a repeater device for relaying signals between the output-limited portable telephone set and the base station and which is configured for accepting hand-over of said portable telephone set from the portable telephone output limiting management device, wherein different frequencies are assigned to an inside communication radio channel adapted for having communication between the portable telephone set and said base station and to an outside communication radio channel adapted for having communication with said base station;

a radio wave having a limited output power being used for communication with said portable telephone set by said inside communication channel; the repeater device comprising:

means for periodically communicating information on the vacant channel of said inside communication channel under a normal situation to said portable telephone output limiting management device;

means for issuing a network establishing request to said base station on reception of a channel connection establishing request for the outside communication channel from said portable telephone output limiting management device, said means receiving a notification to an effect that a new radio channel has been acquired at said base station to notify an effect of acquirement of the outside communication channel via said device control channel to said portable telephone output limiting management device; and means for notifying an effect of hand-over completion to said base station on reception of the notification of the hand-over completion from said portable telephone set if a hand-over command has previously been issued from the portable telephone output limiting management device to the portable telephone set, for switching to relay communication between said portable telephone set and the base station.

* * * * *